(12) United States Patent
Kawanaka et al.

(10) Patent No.: US 9,970,749 B2
(45) Date of Patent: May 15, 2018

(54) SHEET OF COLLOIDAL CRYSTALS IMMOBILIZED IN RESIN, METHOD OF DISPLAYING STRUCTURAL COLOR USING SAME, METHOD FOR DETECTING UNEVENNESS DISTRIBUTION OR HARDNESS DISTRIBUTION OF SUBJECT USING SAME, AND STRUCTURAL COLOR SHEET

(71) Applicants: Fuji Kagaku Corporation, Osaka (JP); National Institute For Materials Science, Ibarki (JP)

(72) Inventors: Satoshi Kawanaka, Osaka (JP); Fumio Uchida, Osaka (JP); Tsutomu Sawada, Ibaraki (JP); Seiichi Furumi, Ibaraki (JP); Hiroshi Fudoji, Ibaraki (JP)

(73) Assignees: FUJI KAGAKU CORPORATION, Osaka (JP); NATIONAL INSTITUTE FOR MATERIALS SCIENCE, Tsukuba-shi, Ibaraki (JP)

( * ) Notice: Subject to any disclaimer, the term of this patent is extended or adjusted under 35 U.S.C. 154(b) by 86 days.

(21) Appl. No.: 14/910,431

(22) PCT Filed: Aug. 5, 2014

(86) PCT No.: PCT/JP2014/070650
§ 371 (c)(1),
(2) Date: Feb. 5, 2016

(87) PCT Pub. No.: WO2015/020066
PCT Pub. Date: Feb. 12, 2015

(65) Prior Publication Data
US 2016/0202046 A1 Jul. 14, 2016

(30) Foreign Application Priority Data

Aug. 6, 2013 (JP) .................................. 2013-163657
Mar. 10, 2014 (JP) .................................. 2014-046966

(51) Int. Cl.
*G01B 11/24* (2006.01)
*G02B 5/18* (2006.01)
(Continued)

(52) U.S. Cl.
CPC .............. *G01B 11/24* (2013.01); *G02B 1/005* (2013.01); *G02B 1/04* (2013.01); *G02B 5/1861* (2013.01);
(Continued)

(58) Field of Classification Search
CPC .......... G01B 11/24; G02B 1/005; G02B 1/04; G02B 5/1861; G02B 5/207; G02B 5/26; G02B 5/28
(Continued)

(56) References Cited

U.S. PATENT DOCUMENTS

| 5,139,611 A | 8/1992 | Pusey et al. |
| 6,894,086 B2 * | 5/2005 | Munro .................... C09D 5/004 264/1.7 |
| 7,045,195 B2 | 5/2006 | Ozin et al. |

FOREIGN PATENT DOCUMENTS

| JP | 3-504462 | 3/1991 |
| JP | 2002028471 A | 1/2002 |

(Continued)

OTHER PUBLICATIONS

International Search Report, PCT/JP2014/070650 dated Nov. 11, 2014 (2 pages).
(Continued)

*Primary Examiner* — Sunghee Y Gray
(74) *Attorney, Agent, or Firm* — Eversheds Sutherland (US) LLP

(57) ABSTRACT

Provided are: a sheet of colloidal crystals immobilized in resin exhibiting intense structural color, enabled to be observed easily from a squarely facing direction against a
(Continued)

surface; and use thereof. The sheet of the present invention, assuming a direction perpendicular to part of a surface of a target area including partially the sheet surface is set as a specified axis, satisfies: (1) The target area includes plural inclined back-reflecting crystal-domains crystal domains having colloid particles immobilized in resin and including crystal lattice planes capable of Bragg-back reflecting at least some of components in a visible wavelength range of incident light having greater than 0 incident angle with the specified axis; and (2) By defining an azimuth angle around the specified axis, the inclined back-reflecting crystal-domains are so oriented that intensity of reflected light caused by Bragg back reflection varies depending on the azimuth angle of the incident light.

19 Claims, 20 Drawing Sheets

(51) Int. Cl.
  G02B 5/28 (2006.01)
  G02B 1/04 (2006.01)
  G02B 1/00 (2006.01)
  G02B 5/20 (2006.01)
  G02B 5/26 (2006.01)

(52) U.S. Cl.
  CPC ............... *G02B 5/207* (2013.01); *G02B 5/28* (2013.01); *G02B 5/26* (2013.01)

(58) Field of Classification Search
  USPC .......................................................... 356/601
  See application file for complete search history.

(56) References Cited

FOREIGN PATENT DOCUMENTS

| | | |
|---|---|---|
| JP | 2010155068 A | 7/2010 |
| JP | 2012000994 A | 1/2012 |
| JP | 2012210311 A | 11/2012 |

OTHER PUBLICATIONS

Iwayama, Yumie et al., "Optically Tunable Gelled Photonoic Crystal Covering Almost the Entire Visible Light Wavelength Region", Langmuir, The ACS Journal of Surfaces and Colloids, vol. 19, No. 4, Feb. 18, 2003 (4 pgs.).

Fudouzi, Hiroshi et al., "Colloidal Crystals with Tunable Colors and Their Use as Photonic Papers", Langmuir 2003, vol. 19, pp. 9653-9660.

\* cited by examiner

Direction of the translational motion

Fig. 23B
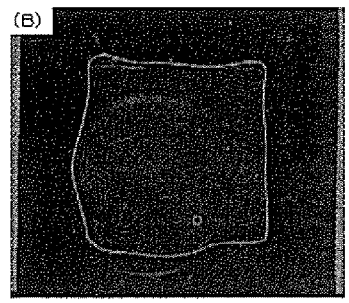
Fig. 24A
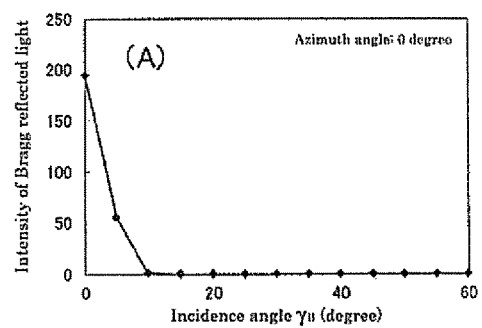
Fig. 24B
Fig. 25A
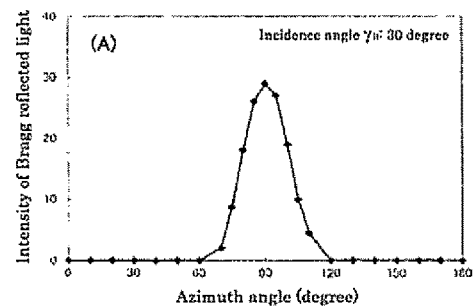

SHEET OF COLLOIDAL CRYSTALS IMMOBILIZED IN RESIN, METHOD OF DISPLAYING STRUCTURAL COLOR USING SAME, METHOD FOR DETECTING UNEVENNESS DISTRIBUTION OR HARDNESS DISTRIBUTION OF SUBJECT USING SAME, AND STRUCTURAL COLOR SHEET

CROSS-REFERENCE TO RELATED APPLICATIONS

This application claims priority to Japanese Application 2013-163657 filed Aug. 6, 2013; Japanese Application No. 2014-046966 filed Mar. 10, 2014; and International Patent Application PCT/JP2014/070650 filed Aug. 5, 2014, the subject matter of which is expressly incorporated herein by reference in its entirety.

TECHNICAL FIELD

The present invention relates to a sheet of colloidal crystals immobilized in resin and an application utilizing the same. Specifically, the present invention relates to the sheet of colloidal crystals immobilized in resin capable of making its structural color developed strongly in the coloration and observed easily even from a squarely facing direction and relates to applications thereof.

BACKGROUND ART

The matter with inner structure in which fine particles of a uniform particle size (particle diameter: 50 nm to 1000 nm, which is called a colloidal particle) are arranged in a three-dimensional periodic manner is called a colloidal crystal. The colloidal crystal appears with coloration by the effect of Bragg reflection of light due to the periodic structure such that it is expected to become a material expressing coloration (structural color) caused by the structure (i.e., material of structural color) wherein the coloration by structure is different from coloration by dye. And a colloidal crystal where resin is filled in space between fine particles is also known (it is also called colloidal crystals immobilized in resin).

In such colloidal crystals, there is a colloidal crystal of non-oriented polycrystals in which crystal domains of from a micron size to a millimeter size in which particles are arranged in a three dimensional periodic arrangement are put together with a randomly orientated relationship with each other (for example, Non-patent reference 1). In such a colloidal crystal of non-oriented polycrystals, condition of angles which gives rise to Bragg reflection differs in each crystal domain such that, as a whole, the structural coloration effect may be obtained in an arbitrary direction. This crystal domain is generally defined as an area constituted of a single crystal.

In another colloidal crystal, there may be obtained a state that crystal domains having sizes not exceeding several millimeters are oriented such that specific crystal lattice planes are orderly arranged in a specific space orientation in the crystal domains. As a manufacturing method of such a colloidal crystal, for example, there is a method to obtain a colloidal crystal having a surface parallel to a base plane by evaporating dispersion liquid gently from a predetermined colloidal solution after spreading the colloidal solution on a flat base plate (for example, Non-patent reference 2). In this case, the colloidal crystal in which a specific crystal lattice plane is oriented in parallel to a surface of a base plate (therefore, the specific crystal lattice plane is also parallel to the surface of the colloidal crystal) may be obtained.

Or, as another method of manufacturing a colloidal crystal, it is also named to produce a colloidal crystal by oscillating relatively parallel planes opposing each other after inserting a predetermined colloidal solution in a narrow gap between the parallel planes wherein the amplitude of the oscillation is set comparable to the gap of the two planes (for example, Patent reference 1). In this case, the whole colloidal crystal may have an orientation state such that the whole colloidal crystal can be substantially regarded as a single crystal since all crystal domains are oriented as the three-dimensional crystal orientation is aligned according to Patent reference 1.

There is a colloidal crystal sheet in which colloidal crystals oriented in such a way are immobilized by elastic member such as polydimethyl silicone (hereinafter, referred to as "oriented colloidal crystal sheet") (for example, Non-patent reference 2). In the oriented colloidal crystal sheet, since the angle condition to cause the Bragg reflection by a specific crystal lattice plane is to be the same as that in any of the crystal domains, a strong effect of the structural coloration can be obtained in the specific direction.

However, the colloidal crystal of non-oriented polycrystals has a disadvantage that the intensity of coloration is weak since the number of crystal domains that contribute to the Bragg reflection to an arbitrary direction is less than the number of crystal domains that contribute to the Bragg reflection to a specific space orientation in the oriented colloidal crystal sheet (for example, a colloidal crystal sheet in Non-patent reference 2). Here, it is assumed that the size of each crystal domain is the same or comparable.

Further, in a colloidal crystal of Patent reference 1 and an oriented colloidal crystal sheet of Non-patent reference 2, since the crystal domains are oriented such that the specific crystal lattice plane may be arranged to be parallel to the surface of the sheet, if the effect of the structural coloration caused by the Bragg reflection is supposed to be given to an observer who intends to make an observation from the squarely facing direction (i.e., a direction perpendicular to the surface) against the surface of the colloidal crystal and the colloidal crystal sheet, it is necessary to irradiate the surface from the squarely facing direction with the illumination light such that the illumination axis and the observation axis overlap. The above-mentioned configuration is not so practical that it is desired to improve the colloidal crystal.

Therefore, there is a demand to develop a colloidal crystal to achieve the structural coloration effect strongly in the squarely facing direction against the surface of the colloidal crystal wherein the squarely facing direction is the observation direction most naturally selected.

PRIOR ART REFERENCES

Patent References

[Patent Reference 1] Japanese Patent Application Publication No. H3(1991)-504462
[Non-Patent Reference 1] Iwayama et al., Langmuir 19 (2003) 977-980
[Non-Patent Reference 2] Fudouzi, Xia, Langmuir 19 (2003) 9653-9660

SUMMARY OF THE INVENTION

Problem to be Solved by the Invention

As mentioned above, the issue of the present invention is to provide a sheet of colloidal crystals immobilized in resin that exhibits intense structural color and may enable the structural color to be observed easily from a squarely facing direction against a surface; and an application thereof.

Means to Solve the Problem

A sheet of colloidal crystals immobilized in resin according to the present invention satisfies the following Conditions (1) and (2) when, in a target area including at least part of a surface of the sheet of colloidal crystals immobilized in resin, a squarely facing direction that is a direction perpendicular to the above-mentioned surface is defined as a specified axis, and thus, the problem is solved.
(1) The above-mentioned target area includes a plurality of crystal domains (hereinafter, referred to as "inclined back-reflecting crystal-domains") in which colloidal particles are immobilized in resin, the crystal domains including a crystal lattice plane capable of substantial Bragg back reflection of at least part of components in the visible wavelength range of incident light that forms an incident angle of more than 0 degree with the specified axis.
(2) In the case where an azimuth angle is specified around the specified axis, the plurality of inclined back-reflecting crystal-domains are oriented so that the intensity of reflected light caused by the above-mentioned Bragg back reflection varies depending on the azimuth angle of the incident light (hereinafter, referred to as "azimuthal orientation").

The plurality of inclined back-reflecting crystal-domains may be oriented so that the normal line of a crystal lattice plane included in each of the inclined back-reflecting crystal-domains and involved in Bragg back reflection forms an angle of at least greater than 0 degree and smaller than 15 degree with the specified axis, and, when a Bragg back reflection measurement is performed with varying the azimuth angle of the incident light, at least one peak is attained on a graph where the intensity of Bragg back reflection is taken as an evaluation axis and an azimuth angle is taken as a variable axis. The target area may include an inclined back-reflecting crystal-domain having a crystal lattice plane having a normal line that forms an angle of at least greater than 15 degree and not exceeding 20 degree with the specified axis. The sheet of colloidal crystals immobilized in resin may be produced by a method including a shearing treatment step in which a shearing force is made to act on the target area in a shearing direction that is a direction parallel to the surface of the target area and serves as a reference direction of an azimuth angle, and the azimuth angle of the at least one peak obtained by the Bragg back reflection measurement may be in a range of from 80 degree to 100 degree. The particle concentration of the colloidal particles may be not less than 2% by volume and not exceeding 35% by volume. The resin may be selected from the group consisting of acrylic resin, epoxy resin, siloxane resin (silicone), urethane resin, polyester resin, alkyd resin, fluororesin, and polyether resin. The resin may be an acrylic resin, and a compound to form the acrylic resin is at least one selected from the group consisting of methyl (meth)acrylate, 2-hydroxyethyl (meth)acrylate, 2-hydroxypropyl (meth)acrylate, 4-hydroxybutyl (meth)acrylate, methoxy triethylene glycol (meth)acrylate, methoxy tetraethylene glycol (meth)acrylate, methoxy polyethylene glycol (meth)acrylate, ethylene di(meth)acrylate, triethylene glycol di(meth)acrylate, tetraethylene glycol di(meth)acrylate, polyethylene glycol di(meth)acrylate, polypropylene glycol di(meth)acrylate, trimethylolpropane tri(meth)acrylate, pentaerythritol tri(meth)acrylate, dipentaerythritol hexa(meth)acrylate, and pentaerythritol tetra(meth)acrylate. The resin may be an epoxy resin, and a compound to form the epoxy resin may include a diglycidyl ester derivative compound and/or a diglycidyl ether derivative compound, and a phthalic anhydride derivative compound. The diglycidyl ester derivative compound may be phthalic acid diglycidyl ester and/or hexahydrophthalic acid diglycidyl ester. The diglycidyl ether derivative compound may be at least one selected from the group consisting of glycerol polyglycidyl ether, 1,4-butanediol diglycidyl ether, and bisphenol-A diglycidyl ether.

The phthalic anhydride derivative compound may be 4-methylhexahydrophthalic anhydride and/or hexahydrophthalic anhydride. The sheet of colloidal crystals immobilized in resin may have a thickness of more than 0.3 mm and not exceeding 10 mm. A method of displaying a structural color based on colloidal crystals according to the present invention includes the step of irradiating the sheet of colloidal crystals immobilized in resin with illumination light, whereby the above-mentioned problem is solved. In the step of irradiating the sheet with the illumination light, the sheet may be irradiated with the illumination light from a direction different from a direction squarely facing the sheet surface of the above-mentioned sheet of colloidal crystals immobilized in resin. The sheet of colloidal crystals immobilized in resin may be produced by applying a shearing treatment, and in the step of irradiating the sheet with the illumination light, the illumination light may be irradiated from a direction having an azimuth angle perpendicular to the shearing treatment direction of the shearing treatment. The sheet of colloidal crystals immobilized in resin may have a pattern comprising a character or a figure. The sheet of colloidal crystals immobilized in resin may be sandwiched at least between a hard transparent plate and a relief plate in which a pattern comprised of a character or a figure is formed in a concave and/or convex pattern, and there may be included the step of pressing the sheet of colloidal crystals immobilized in resin with the hard transparent plate prior to the step of irradiating the illumination light. A method of detecting the unevenness distribution or the hardness distribution of a test object according to the present invention comprises the steps of: covering a test object with the sheet of colloidal crystals immobilized in resin and pressing the sheet with a hard transparent plate; irradiating illumination light on the sheet of colloidal crystals immobilized in resin and observing the sheet of colloidal crystals immobilized in resin through the hard transparent plate; and detecting the unevenness distribution or the hardness distribution based on observation results obtained in the observation step, whereby the above-mentioned problem is solved. In the observation step, the observation may be conducted by irradiating the illumination light from a direction different from a direction squarely facing the sheet surface of the sheet of colloidal crystals immobilized in resin. The detecting step may comprise, if the observation results are the same as those of the sheet of colloidal crystals immobilized in resin before the pressing step, detecting that the test object has no unevenness or hardness distribution, while, if the observation results are different from those of the sheet of colloidal crystals immobilized in resin before the pressing step, detecting that the test object has unevenness or hardness distribution. A structural color sheet according to the present invention comprises a plurality of sheet pieces of colloidal crystals immobilized in resin are immobilized in resin, the plurality of sheet pieces of colloidal crystals immobilized in resin are cut out of the sheet of colloidal crystals immobilized in resin, and the plurality of sheet pieces of colloidal crystals immobilized in resin are positioned in an arbitrary orientation relationship in the resin, whereby the above-mentioned problem is solved.

Here, the "target area" is a part or the entirety of the sheet of colloidal crystals immobilized in resin, and denotes an area including a plurality of crystal domains in which colloidal particles are immobilized in the resin, and at least apart of these crystal domains is capable of reflecting incident light according to Bragg reflection. The "surface" of this "target area" coincides with (or is in common with) the surface of the corresponding area of the sheet of colloidal crystals immobilized in resin, and substantially constitutes a plane. However, the surface of the sheet of colloidal crystals immobilized in resin may not be a plane and may be a curved surface, and, if viewed at a macroscopic level, may have convex and concave. The "surface" of the "target area" may be good enough to let the incident light pass inside (or into the inside of the sheet of colloidal crystals immobilized in resin) such that the "surface" may have microscopic concave and convex portions. The squarely facing direction of the "surface" may comprise the normal line direction of a plane substantially constituted of the "surface" (a direction perpendicular to the "surface"). Here, directions other than the squarely facing direction may form an angle of more than 0 degree and not exceeding 90 degree with the specified axis. Accordingly, the incident light may travel so as to approach said "surface".

Bragg reflection is a phenomenon in which, among light with which colloidal crystal having a three-dimensional periodic matter with inner structure is irradiated, only light having a specific wavelength is reflected off a group of specific crystal lattice planes of the colloidal crystal (a group of lattice planes in the laminated). In general, a Bragg reflection wavelength $\lambda$ is determined by what is called "equation of Bragg condition": $m \cdot \lambda = 2 \cdot n \cdot d \cdot \sin(\alpha)$. Here, m is what is called the order of Bragg reflection and is a positive integer. Typically, the intensity of Bragg reflection is the highest when $m=1$, while the intensity of Bragg reflection is low when $m \geq 3$ such that the reflection may not be substantially detected in many cases. In the equation of Bragg condition, n denotes the average refractive index of a medium of light (here, the sheet of colloidal crystals). In the equation of Bragg condition, d denotes an inter-plane distance of crystal lattice planes involved in the Bragg reflection. In the equation of Bragg condition, a denotes what is called a Bragg angle, and denotes an angle obtained by subtracting from 90 degree an angle formed by the axis of the incident light in a crystal and the normal line of the crystal lattice plane. Furthermore, $\lambda$ in the equation of Bragg condition denotes a wavelength of light in a vacuum (substantially equal to a wavelength in the air). In particular, the Bragg reflection, when $\alpha=90$ degree, is called Bragg back reflection since the reflected light travels backward along the path of the incident light. In the Bragg reflection, even when the incident light contains various wavelength components such as white light, light having a specific wavelength that satisfies the equation of Bragg condition is selectively reflected. Hence, when the Bragg reflection occurs with respect to light having a wavelength in a visible wavelength range (for example, from 360 nm to 830 nm (refer to the description about "visible light" in Wikipedia)), the light may be viewed by the human eye as the light having a color according to the wavelength of the selectively-reflected light.

The reference to all light or the Bragg reflection as mentioned in the present specification may be limited to any light having a wavelength in the above-mentioned visible wavelength range unless otherwise noted. The phrase of "substantially reflect according to the Bragg back reflection" denotes that the intensity of light reflected in accordance with the Bragg back reflection may be detectably strong enough for the measurement. Even in the case where each of the physical quantities ($\lambda$, n, d, $\alpha$) with respect to the light with which a crystal domain is irradiated and a crystal lattice plane included in the crystal domain satisfies the condition of the equation of Bragg condition, if the order of Bragg reflection is at least 3, if the number of layers in which crystal lattice planes are involved is small, or if there are any substantial disorders in the crystal arrangement of particles, the Bragg reflection may not occur such that the intensity of the reflected light may not be strong enough to be actually measured. In this case, even if it can be theoretically judged that the Bragg back reflection occurs, it cannot be said to "substantially reflect light in accordance with the Bragg back reflection". Here, the crystal domain may denote a minimum crystal unit that causes such Bragg reflection. Furthermore, "reflecting light in the squarely facing direction" can denote a state in which the light travels farther from the "surface" in a direction along the squarely facing direction (including "a substantially squarely-facing direction").

The size of this "target area" is not particularly limited, and may be the same as the size of the sheet of colloidal crystals immobilized in resin, and may be a size to the extent that the target area is included in the sheet of colloidal crystals immobilized in resin as a part thereof. The surface of the "target area" typically coincides with the surface of the corresponding portion of the sheet of colloidal crystals immobilized in resin. The target area may include a plurality of inclined back-reflecting crystal-domains, and the plurality of inclined back-reflecting crystal-domains may be oriented in an azimuth direction. Here, the azimuth angle of the inclined back-reflecting crystal-domain denotes an angle formed by a reference azimuth direction and a straight line, the straight line being formed by the intersection of the surface plane of the target area (or the surface of the sheet) and a plane that includes the normal line of a crystal lattice plane, the crystal lattice plane included in said inclined back-reflecting crystal-domain and involved in the Bragg back reflection, and is parallel to the specified axis (for example, a plane parallel to the paper surfaces of FIGS. 8 and 9. Hereinafter, referred to as a "specified normal-line plane".). Since a squarely facing Bragg reflection caused by an inclined back-reflecting crystal-domain is a phenomenon caused by the incident light and the reflected light thereof in this specified normal-line plane, the azimuth angle of the inclined back-reflecting crystal-domain can be defined in a range of from 0 to 360 degree.

For example, when light is irradiated on the surface of a target area at a certain incident angle with respect to the normal line direction of said surface (that is, the direction of the specified axis), if one or more inclined back-reflecting crystal-domains are included in this target area, a light beam caused by the Bragg reflection can leave in the squarely facing direction (the normal line direction), The orientation and position of such crystal domain will be described later in detail. On the other hand, in the case where mirror reflection is made on said surface, unless the incident light enters along the specified axis (that is, the light enters from the squarely facing direction), according to the law of reflection (The incident light and the reflected light are on the same plane as a normal line made at an incident point on the boundary surface of a medium and are on the opposite side of the normal line. Here, the incident angle of the light to be reflected is equal to the reflection angle thereof.), theoretically, reflected light does not leave in the squarely facing direction. When light undergoes irregular reflection (or diffused reflection) on said surface due to minute convex and concave of said surface, reflected light traveling in the squarely facing direction can be also observed.

The sheet of colloidal crystals immobilized in resin may include a plurality of target areas. Each of the target areas may be specified by a surface thereof or a corresponding specified axis thereof, and the three-dimensional orientation of a plurality of inclined back-reflecting crystal-domains included in each of the target areas may be specified by the orientation of the normal lines of crystal lattice planes included in said inclined back-reflecting crystal-domains and involved in the Bragg back reflection. Furthermore, the above-mentioned three-dimensional orientation of the normal line may be specified by an angle formed by the normal line and the corresponding specified axis and an azimuth angle measured in the counterclockwise direction around the specified axis. In general, a single crystal sometimes includes a plurality of crystal lattice planes having different orientations. In this case, there is a possibility that one crystal domain (treated as a single crystal) could include a plurality of crystal lattice planes having different orientations and capable of reflecting, in accordance with the Bragg back reflection, light having a wavelength in the visible wavelength range. In this case, the crystal lattice planes having different directions are capable of reflecting light having different incident angles in accordance with the Bragg back reflection, and therefore, a plurality of orientations can be defined for the one crystal domain. Sometimes, each of the crystal lattice planes has a corresponding azimuth angle. In this case, there is a possibility that even a single inclined back-reflecting crystal-domain could serve substantially as a plurality of inclined back-reflecting crystal-domains, each of which has a corresponding azimuth angle. Hence, such case is equivalent to a case in which there exist a plurality of inclined back-reflecting crystal-domains, each of which individually has a corresponding azimuth angle. Therefore, here, one crystal domain is treated as the domain having only one crystal lattice plane that is capable of reflecting light in the visible wavelength range in accordance with the Bragg back reflection.

The incident angle of incident light with which each of target areas is irradiated may denote an angle formed by the incident light and each of the specified axes (an angle of at least 0 degree and not exceeding 90 degree. An angle of more than 90 degree corresponds to outgoing light from the target area.). Typically, the azimuth angle of the incident light may denote an angle of a straight line (or a line segment), the angle being measured (here, in the counterclockwise direction when the specified axis is viewed from a light source side) from a predetermined reference orientation (the orientation of an azimuth angle of 0), the straight line being formed, on a plane constituted by the surface of a target area, of an orthogonal projection of a straight line (or a line segment) extending from an incident point on said plane and representing a beam of the incident light entering at said incident point (that is, the path or locus of light). In the case where a shearing treatment is performed in one direction in the plane constituting the above-mentioned surface in the process of producing the sheet of colloidal crystals immobilized in resin, a predetermined reference orientation may be the direction of the shearing (that is, the azimuth angle of the shearing direction is 0 degree (in the case of a reciprocating motion, 0 or 180 degree)). In the case where the shearing treatment is performed in one direction, but includes reciprocating processing, the azimuth angle may be specified in the counterclockwise direction when viewed from the outer side of the sheet of colloidal crystals immobilized in resin (that is, the light source side).

The incident light may have an incident angle that allows the Bragg back reflection on an inclined back-reflecting crystal-domain, and one or more incident light beams may be present. A phenomenon in which the intensity of back reflected light caused by the Bragg reflection of incident light varies depending on the azimuth angle of the incident light may denote that, for example, when the azimuth angle of the incident light is made to substantially continuously vary from 0 to 180 degree (furthermore, to 360 degree), the intensity of the light becomes lower or higher beyond the margin of error caused by the noise. In the Bragg reflection, even when the incident light has various wavelengths like white light, since the light having a specific wavelength is reflected, the incident light is distinguishable from the light typically reflected off a surface or the like (for example, mirror reflection light).

Here, an incident angle that allows the back reflection in an inclined back-reflecting crystal-domain may denote an incident angle that is preferable for performing a back reflection spectrum measurement. This preferable incident angle may be suitably selected. For example, a specific angle within a range of from 5 to 15 degree, a range of from 15 to 25 degree, or a range of from 25 to 35 degree. Here, a peak may denote a state in which, at an arbitrary azimuth angle within a range from an azimuth angle corresponding to the peak position minus 90 degree to the azimuth angle corresponding to the peak position plus 90 degree (or minus 60 degree to plus 60 degree, minus 30 degree to plus 30 degree, or minus 15 degree to plus 15 degree), while the intensity of incident light remains constant, the intensity of light caused by the Bragg reflection at each of the azimuth angles is relatively lower than the intensity of the light caused by the Bragg reflection at the peak-corresponding azimuth angle. In particular, when variations in the intensity of light caused by the Bragg reflection as a function of azimuth angle variations are suitably smoothed at angles around the peak-corresponding azimuth angle, in the case where the intensity of the Bragg reflection monotonously increases until the neighborhood of the peak-corresponding azimuth angle and the intensity of the Bragg reflection monotonously decreases after beyond the neighborhood of the corresponding azimuth angle, the case may be recognized that there is a peak at said peak-corresponding azimuth angle. For example, when the intensity of light is measured by continuously increasing or decreasing an azimuth angle, the highest intensity thereof may be measured within a range of an azimuth angle width (for example, ±0.1 degree and the like), As for the smoothing, there may be employed any known methods, such as a method of replacing the intensity at each spectrum data point with the intensity average of three data points constituted of the data point and two points adjacent to said data point.

Here, the sheet of colloidal crystals immobilized in resin may signify what is like a sheet shape in which the above-mentioned plurality of crystal domains are immobilized in resin so as to maintain respective crystal states thereof. The shape of sheet-like form may be a shape which is typically interpreted as the sheet form, and may be, for example, a plate or a sheet shape having a certain thickness. Alternatively, the sheet may be a curved sheet, or may have unevenness on the surface thereof. As long as the conditions for the crystal domain are satisfied, the external shape of the sheet of colloidal crystals immobilized in resin may not be particularly limited. For example, the external shape may be any shape, such as a rectangle, a square, a circle, or an ellipse, or a combination of these shapes. In particular, it is preferable that flexibly elastic deformation and/or flexibly plastic deformation in the thickness direction is allowed for the sheet.

The shearing treatment may be such a treatment that surfaces of the sheet opposing each other (for example, the upper surface and the bottom surface, or respective surfaces which contact or adhere corresponding shearing plates arranged in an opposing manner and to which force is applied to cause shearing) are moved with a relative displacement in one direction. This direction (shearing direction) may be in parallel or substantially parallel to the sheet surface. Furthermore, this shearing treatment may be performed locally. For example, only in a target area, shearing forces may be applied to a front surface thereof and a back surface thereof (the back surface may correspond to the back surface of the sheet). Furthermore, the relative displacement may be made rectilinear or may be made curvilinear. For example, force to cause shearing action (shearing force) may be applied in a rectilinear manner to the front surface while the back surface is fixed; or force to cause shearing action (shearing force) may be applied to the front surface in such a rotation manner as the spinning top while the back surface is fixed. In particular, the relative displacement is preferably linear and to be a single or multiple of reciprocating motions. The direction of the azimuth angle to serve as the reference orientation may be a direction parallel to the shearing direction of the shearing treatment. A state in which the intensity of the Bragg reflection caused in the plurality of crystal domains is not 0 may denote that light caused by the Bragg reflection is recognized beyond measurement errors. Furthermore, in a reflection spectrum measurement, a peak in the intensity of light caused by the Bragg reflection may be recognized. Furthermore, the back reflection spectrum measurement for the sheet surface with this case is performed in such a manner that, as illustrated in FIG. 7, the sheet is irradiated with light serving as incident light, and reflected light that travels back through the same path of that of the incident light is measured. The incident angle corresponds to an angle formed by the incident light and the specified axis specifying the target area that is irradiated with the incident light. The back reflection spectrum measurement may be performed throughout the entire range of the incident angle of the incident light of not less than 0 degree and not exceeding 30 degree (substantially including the entire range thereof). Alternatively, the measurement may be performed in part of the whole range.

Effects of the Invention

Condition (1) allows the Bragg reflection to be observed without overlapping of the illumination axis of illumination light and the observation axis of an observer who squarely faces the sheet surface of the sheet of colloidal crystals immobilized in resin according to the present invention, and therefore, allows the observer squarely facing the sheet surface to easily observe a structural color. Furthermore, Condition (2) allows the sheet of colloidal crystals immobilized in resin according to the present invention to cause the strong color development of the structural color. The use of the sheet of colloidal crystals immobilized in resin according to the present invention, the sheet satisfying the above-mentioned Conditions (1) and (2), allows the observer to observe the structural color under the condition that surface reflected light does not overlap Bragg reflected light, whereby the effect of clear color development is achieved.

The use of the sheet of colloidal crystals immobilized in resin according to the present invention makes it possible to display a structural color and detect the unevenness or hardness distribution of a test object. Furthermore, a structural color sheet including sheet pieces of colloidal crystals immobilized in resin that are cut out from the sheet of colloidal crystals immobilized in resin according to the present invention makes it possible to produce an effect of color development even with irradiation of illumination light from an arbitrary direction, and therefore, has an advantage that there is no limitation in practices.

BRIEF DESCRIPTION OF THE DRAWINGS

FIG. 23B is a diagram illustrating an observation result of a structural color of the sample of Comparative Example 9.

FIG. 24A is a diagram illustrating dependency on the incident angle of intensity of Bragg back reflection of a sample of Example 1.

FIG. 24B is a diagram illustrating dependency on the incident angle of intensity of Bragg back reflection of the sample of Example 1.

FIG. 25A is a diagram illustrating dependency on the azimuth angle of intensity of Bragg back reflection of a sample of Example 1.

EMBODIMENT FOR CARRYING OUT THE INVENTION

Figure 1A:
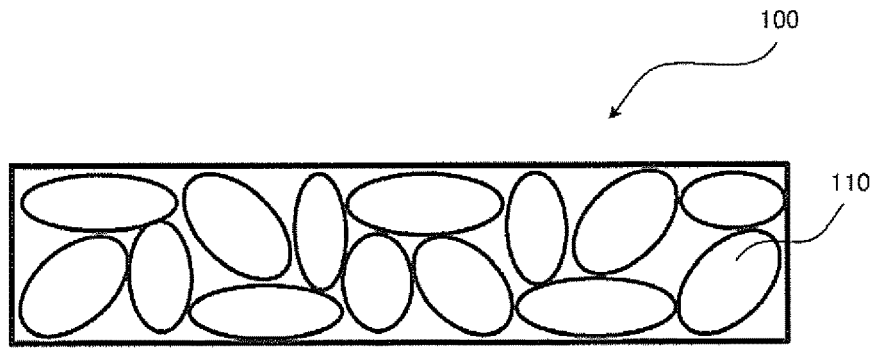
FIG. 1A is a schematic diagram illustrating a sheet of colloidal crystals immobilized in resin according to the present invention.

Hereinafter, with reference to the drawings, embodiments of the present invention will be described in detail. It should be noted that like reference numerals refer to like elements, and a description thereof will be omitted.

Embodiment 1

In Embodiment 1, a sheet of colloidal crystals immobilized in resin according to the present invention and a method of producing the same will be described in detail.

Figure 1B:
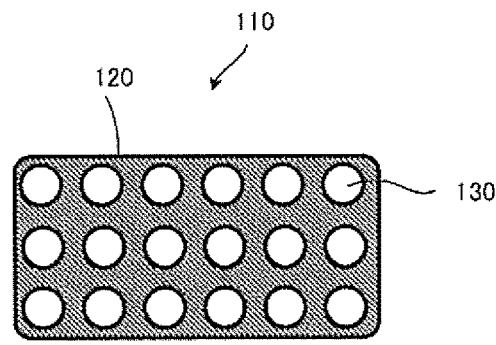
FIG. 1B is a schematic diagram illustrating crystal domains in the sheet of colloidal crystals immobilized in resin.

FIGS. 1A and 1B are schematic diagrams illustrating a sheet of colloidal crystals immobilized in resin according to the present invention. The sheet of colloidal crystals immobilized in resin 100 according to the present invention includes a plurality of crystal domains 110 (FIG. 1A). The plurality of crystal domains 110 comprise colloidal particles 130 immobilized in a resin 120 (FIG. 1B). Here, a three-dimensional periodic arrangement of the colloidal particles 130 in the plurality of crystal domains 110 is made so as to satisfy Bragg reflection conditions. It should be noted that the sheet of colloidal crystals immobilized in resin 100 according to the present invention is characterized in that, among crystal domains, a plurality of inclined back-reflecting crystal-domains satisfying predetermined conditions are included in a target area (for example, a target area 12 in FIG. 4), and the predetermined conditions will be described later with reference to FIGS. 4 to 6 and 8 to 11.

The resin 120 denotes a solid material formed of a polymer, such as synthetic resin, plastics, or elastomer. The resin 120 is formed of at least one kind of compound, and is a polymer made by the polymerization of a monomer, an oligomer, a macromer, or a combination of the at least one compound. Referring to a later-mentioned method of producing the sheet of colloidal crystals immobilized in resin 100 according to the present invention (FIG. 12), as long as a liquid colloidal dispersion containing at least one kind of compound to form the resin 120 is in a colloidal crystal state, the at least one kind of compound is applicable. The suitable selection of the kinds of compounds and blending thereof allow the resin to have a desired hardness or a desired flexibility under a usage environment. Here, the colloidal state denotes a state in which, typically, fine particles or macromolecules having a diameter of approximately 50 nm to 1000 nm ($5\times10^{-5}$ mm to $10^{-3}$ mm) are dispersed in a homogeneous medium, and a liquid in such a colloidal state may be called as a colloid liquid or a liquid colloidal dispersion. Furthermore, the colloidal crystal state may refer to a state in which such fine particles or macromolecules or the like are regularly arranged. It is considered that a liquid colloidal dispersion in such a colloidal crystal state is to constitute a crystal domain.

More specifically, the resin 120 may be selected from the group consisting of acrylic resin, epoxy resin, siloxane resin (silicone), urethane resin, polyester resin, alkyd resin, fluororesin, and polyether resin. These resins are capable of immobilizing colloidal particles so as to satisfy the above-mentioned Conditions (1) and (2). The resin 120 is preferably an acrylic resin or an epoxy resin. These resins make it possible to securely achieve the sheet of colloidal crystals immobilized in resin according to the present invention by the later-mentioned shearing treatment.

In the case where the resin 120 is an acrylic resin, examples of a compound to form the acrylic resin include monofunctional monomers, such as methyl (meth)acrylate, 2-hydroxyethyl (meth)acrylate, 2-hydroxypropyl (meth)acrylate, 4-hydroxybutyl (meth)acrylate, methoxy triethylene glycol (meth)acrylate, methoxy tetraethylene glycol (meth)acrylate, and methoxy polyethylene glycol (meth)acrylate; bifunctional monomers, such as ethylene di(meth)acrylate, triethylene glycol di(meth)acrylate, tetraethylene glycol di(meth)acrylate, polyethylene glycol di(meth)acrylate, and polypropylene glycol di(meth)acrylate; and polyfunctional monomers, such as trimethylolpropane tri(meth)acrylate, pentaerythritol tri(meth)acrylate, dipentaerythritol hexa(meth)acrylate, and pentaerythritol tetra(meth)acrylate, and these may be used alone or in combination of two or more kinds thereof. These are preferable because of their easy availability and simple handling.

In the case where the resin 120 is an epoxy resin, a compound to form the epoxy resin may include a diglycidyl ester derivative compound and/or a diglycidyl ether derivative compound as a base, and a phthalic anhydride derivative compound as a curing agent. More specifically, the diglycidyl ester derivative compound may be phthalic acid diglycidyl ester and/or hexahydrophthalic acid diglycidyl ester. The diglycidyl ether derivative compound may be at least one selected from the group consisting of glycerol polyglycidyl ether, 1,4-butanediol diglycidyl ether, and bisphenol-A diglycidyl ether. The phthalic anhydride derivative compound may be 4-methylhexahydrophthalic anhydride and/or hexahydrophthalic anhydride. These are preferable because of their easy availability and simple handling.

The hardness and flexibility of the resin 120 are sometimes changed depending on a resin selected, or temperature or the like in a usage environment, but, for example, in the case where the resin 120 does not easily become deformed under a usage environment, the sheet of colloidal crystals immobilized in resin is preferable because, for example, the sheet is available for decoration to stably display a certain color. For example, in the case where the resin 120 easily becomes deformed under a usage environment, the sheet of colloidal crystals immobilized in resin is preferable because the sheet is available for pattern display that utilizes deformation of the resin, or for the detection of unevenness distribution or hardness distribution. A person skilled in the art can suitably select such resin 120 having a desired hardness or flexibility.

The colloidal particles 130, having a particle diameter of 50 nm to 1000 nm, are silica particles, polystyrene particles, polymer latex particles, oxide particles such as titanium dioxide, metal particles, or composite particles constituted of a combination of different materials, but are not limited to these. It should be noted that the composite particle is constituted of a combination of two or more kinds of different materials, and denotes what is formed as one particle by encapsulating one material in another material, or what is formed as one particle by binding hemispherical parts constituted of different materials, or the like. As mentioned above, the colloidal particles 130 are arranged in a three-dimensional periodic manner.

Figure 2A:
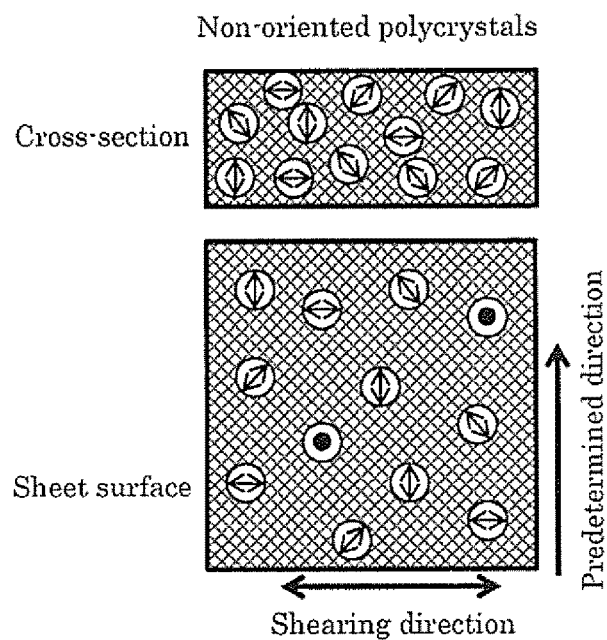
FIG. 2A is a schematic diagram illustrating a state of the crystal domains in the sheet of colloidal crystals of non-oriented polycrystals.
Figure 2B:
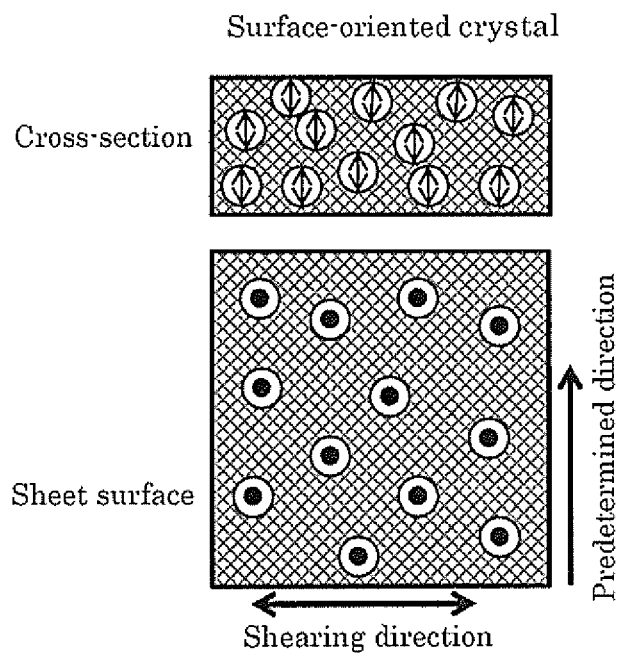
FIG. 2B is a schematic diagram illustrating a state of the crystal domains in the sheet of colloidal crystals of azimuth-oriented crystals.
Figure 2C:
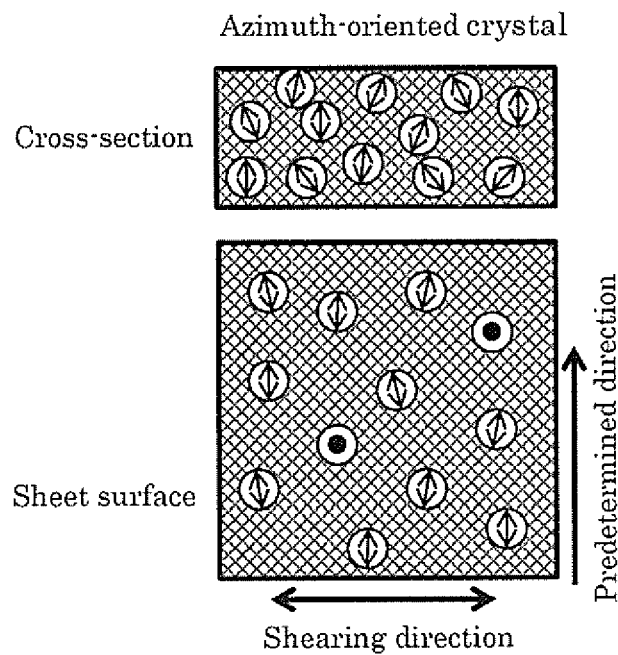
FIG. 2C is a schematic diagram illustrating a state of the crystal domains in the sheet of colloidal crystals of surface-oriented crystals.

FIGS. 2A to 2C are schematic diagrams illustrating states of crystal domains of colloidal crystal sheets, and illustrate A: non-oriented polycrystals; surface-oriented crystals in which crystal lattice planes are oriented in parallel to the surface of the sheet; and azimuth-oriented crystals in which orientation in an azimuth angle direction (a sheet in-plane direction) is made, respectively. The upper side and the lower side of each of the figures are a schematic diagram viewed from a cross-sectional direction and a schematic diagram viewed from a sheet surface, respectively. Here, a hatching portion represents a resin matrix portion, while a portion expressed by a circle is a schematic diagram showing a plurality of crystal domains included therein. However, it is considered that the crystal domains are actually so densely present as to be in contact with each other. Here, it is the object to illustrate a state of orientation such that such an actual state is in the figures. A line segment having an arrow at each end thereof that is drawn in a circle indicates a direction of an orthogonal projection, on the paper surface, of a normal line of a crystal lattice plane included in a crystal domain, the crystal lattice plane allowing incident light entering from the outside of a sheet surface to the sheet surface (including incident light entering the sheet surface perpendicularly) to be reflected for the Bragg back reflection. A circle having a black circle (dot) therein represents a state in which the normal line direction of this crystal lattice plane is perpendicular to the paper surface. From these figures, it is understood that the crystal domains could have different orientations with respect to the sheet surface. That is, in the case of the non-oriented polycrystals, the orientations of crystal domains are random (that is, the domains are not oriented) in the cross section and the sheet surface, and, in the case of the surface-oriented crystals, in the cross section, any one of the normal line directions of the crystal lattice planes included in crystal domains is parallel to the paper surface, while, in the sheet surface, any one of the normal line directions is perpendicular to the paper surface.

In the case of the azimuth-oriented crystals, in the cross section, the normal line directions of the crystal lattice plane included in crystal domains are almost random, while, in the sheet surface, the normal lines are aligned in a predetermined direction to some extent. Hence, in the case of the non-oriented polycrystals, Bragg reflection toward the squarely facing direction by oblique illumination is achieved to some extent, but the intensity of the reflection is low. On the other hand, in the surface-oriented crystals, Bragg reflection toward the squarely facing direction by oblique illumination is hardly achieved, but, Bragg reflection of incident light having a certain incident angle is very strong in itself in the direction of a reflection angle according to the Bragg reflection expression (not the squarely facing direction). Furthermore, in the azimuth-oriented crystals, Bragg reflection toward the squarely facing direction by oblique illumination is achieved to some extent as is the case with the non-oriented polycrystals, but, Bragg reflections are collected in a certain azimuth angle, and accordingly, the intensity thereof is much higher than that in the non-oriented polycrystals.

Figure 3:
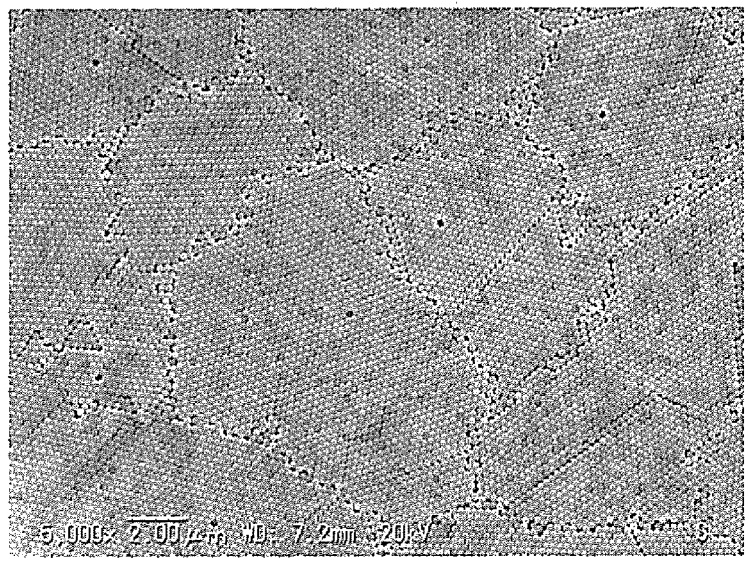
FIG. 3 is a SEM image showing a surface of the sheet of colloidal crystals of polycrystals.

FIG. 3 shows a SEM image showing the surface of a colloidal crystal sheet of polycrystals. This colloidal crystal sheet is a colloidal crystal sheet of polycrystals (the sheet having a sheet thickness of 0.1 mm and a particle concentration of approximately 70% by volume) produced by dropping, onto the surface of a glass substrate, a liquid colloidal crystal dispersion obtained by dispersing polystyrene particles having a particle diameter of 200 nm in water. It is found that an area having the polystyrene particles regularly arranged therein is surrounded by a boundary in which such regularity is slightly lost and thereby gaps are observed. It can be considered that this surrounded area corresponds to a crystal domain in the present invention. However, in the crystal sheet according to the present invention, crystals are immobilized by a resin, and thus, said crystal sheet is different from the sheet in this SEM image.

Figure 4:
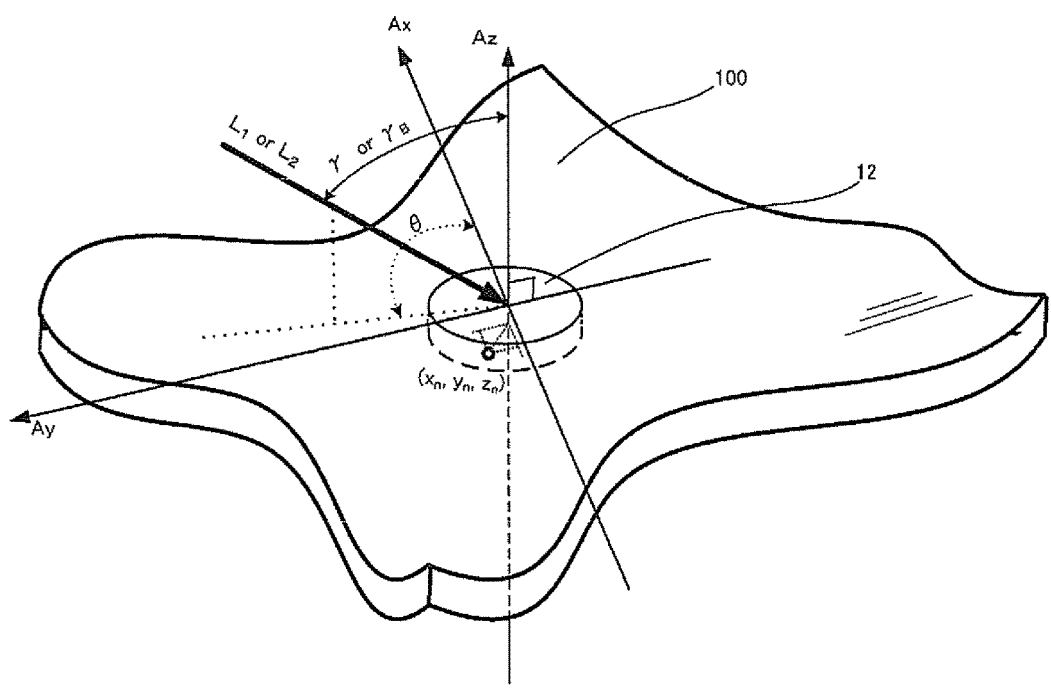
FIG. 4 is a schematic diagram illustrating a target area in the sheet of colloidal crystals immobilized in resin.

FIG. 4 is a schematic view illustrating the target area 12 in the sheet of colloidal crystals immobilized in resin 100 according to the present invention. Here, the target area 12 is expressed in the shape of a cylinder or a column (or a disc), but the shape of the target area 12 is not particularly limited, and may be any shape, such as a rectangle, a square, or an ellipse. The specified axis is denoted by Az. In the sheet surface, Ax axis is drawn as a reference of an azimuth angle (reference orientation) (In many cases, the axis can be made to coincide with a shearing direction). In the above-mentioned sheet surface, Ay axis is drawn in a direction perpendicular to it. Incident light $L_1$ or $L_2$ enters at an incident angle of $\gamma$ or $\gamma_a$, and has an azimuth angle $\theta$. A point denoted by $(x_n, y_n, z_n)$ indicates a typical position of the $n^{th}$ inclined back-reflecting crystal-domain included in the target area 12 (a position that can be regarded as the center of gravity in terms of an effect of Bragg reflection). It can be considered that an angle domain (as mentioned later, the angle corresponds to $\beta$) formed by the specified axis and the normal line of a crystal lattice plane suitable for Bragg reflection on the inclined back-reflecting crystal-domain and an azimuth angle of the inclined back-reflecting crystal-domain (an angle from a reference orientation), and variables related to the efficiency and reflection intensity of Bragg reflection, such as the size and the degree of crystallinity of the inclined back-reflecting crystal-domain, are given every typical position, whereby the inclined back-reflecting crystal-domain can be expressed.

Figure 5:
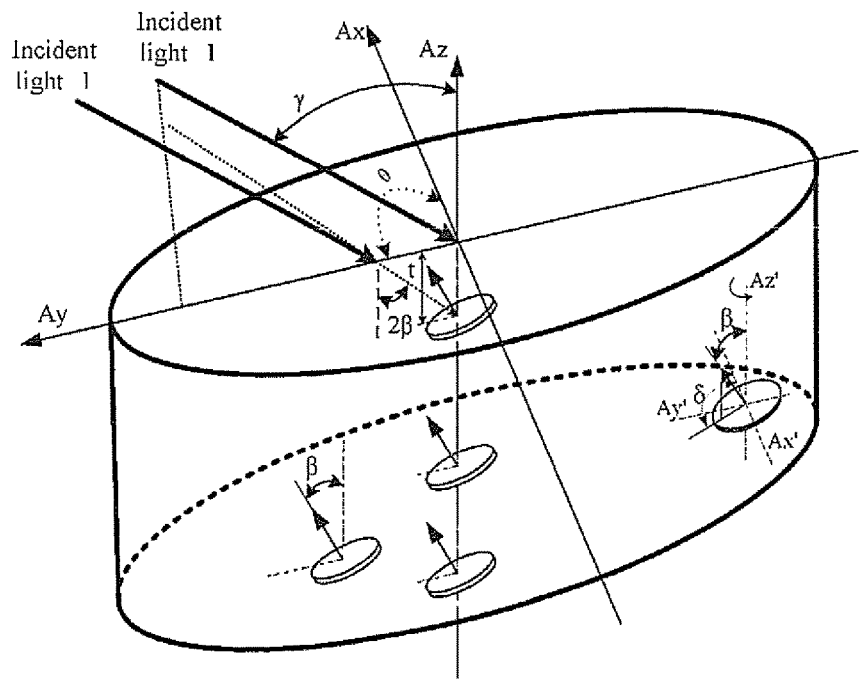
FIG. 5 is a schematic diagram illustrating measurement of reflection spectrum in a squarely facing direction in the target area.

FIG. 5 schematically illustrates how each of the crystal domains contributes to Bragg reflection in the squarely facing direction when the entire surface of the target area 12 in FIG. 4 (that is, the sheet surface) is irradiated with parallel incident lights 1.

Figure 8:
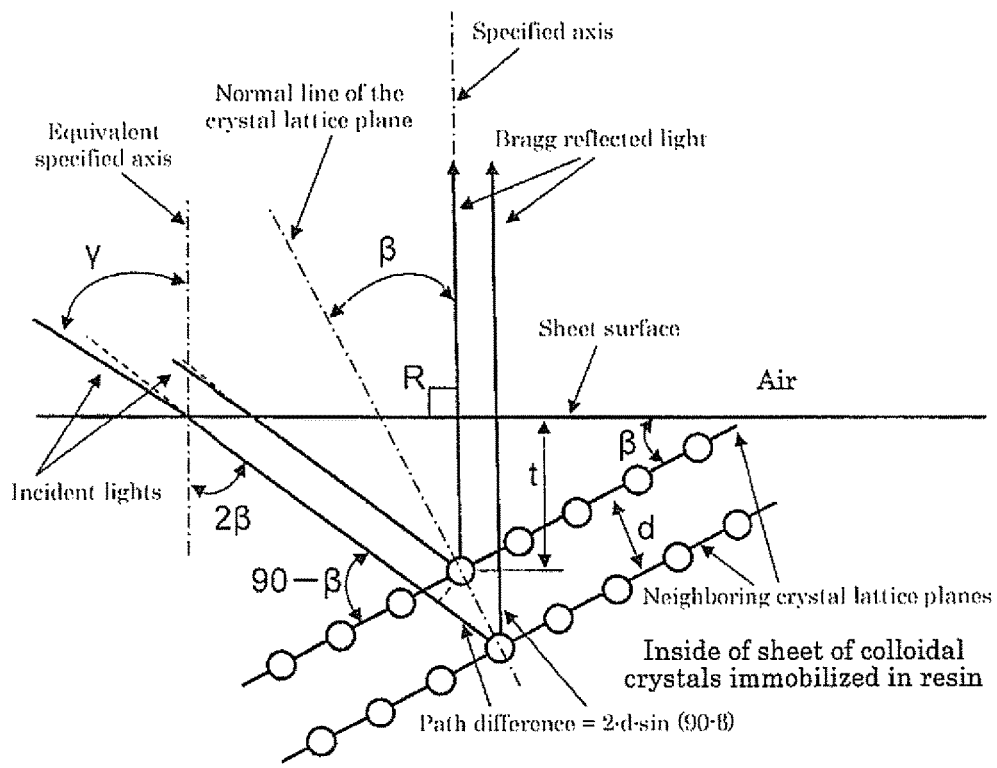
FIG. 8 is a schematic diagram illustrating crystal lattice planes of a crystal domain in the sheet of colloidal crystals immobilized in resin according to the present invention.

Here is shown, for example, a case of $\theta=90$ degree (a case in which a shearing direction is a reference orientation and parallel to Ax axis) wherein the incident light 1 enter at an incident angle $\gamma$ with respect to Az axis, and the azimuth angle $\theta$ of the incident light 1=90 degree (that is, the incident light 1 is directed along a plane specified with Ay and Az axes (or within the plane)). In the target area, there are illustrated schematic figures of four crystal domains capable of contributing to facing Bragg reflection with such incident light 1. The normal line of the crystal lattice plane of each of the crystal domains is illustrated by an up-arrow, and each of the normal lines is inclined an angle $\beta$ with respect to the direction of the specified axis Az (hence, these domains are regarded as inclined back-reflecting crystal-domains as mentioned later). Furthermore, each of the normal lines extends along a plane specified with Ay and Az axes (or within the plane), and an angle $\theta$ corresponding to what is called an azimuth angle is 90 degree. Therefore, as illustrated in FIG. 8 (a cross-sectional view taken along the specified normal line plane in which facing Bragg reflection occurs), Bragg reflection causes Bragg reflected light to be emitted in a direction facing the surface of the target area 12. In particular, regarding crystal domains each of which is penetrated at the center thereof (corresponding to the above-mentioned center of gravity) by Az axis, from a crystal domain positioned at the shallowest depth t, and also from crystal domains which are positioned below the crystal domain at the shallowest depth, Bragg reflected light along Az axis is emitted. In the crystal domain at the shallowest depth, incident light 1 at the left-hand side in the figure enters from an incident point on Ay axis into the target area 12 at an incident angle $\gamma$ and at the refraction angle $2\beta$, and a crystal lattice plane to cause Bragg reflection is irradiated with said incident light 1, and, according to the Bragg reflection conditions, the light is reflected off the crystal lattice plane on the side opposite to the normal line of said plane, leaves the surface of the target area along Az axis, and travels in the squarely facing direction. On the other hand, the center of each of the crystal domains that are positioned below the crystal domain at the shallowest depth is irradiated with another incident light 1 that is parallel to the above-mentioned incident light 1 and enters from the further left side on Ay axis (at an incident angle $\gamma$ and at a refraction angle $2\beta$), and likewise, according to the Bragg reflection conditions, the light reflected on the side opposite to the normal line of the crystal lattice plane leaves the surface of the target area along Az axis, and travels in the squarely facing direction. The same goes for a crystal domain positioned below the above-mentioned crystal domains, except that the crystal domain is irradiated with another incident light 1 on the still further left side. It is considered that incident lights 1 directed along a plane specified with Ay and Az axes (or within the plane) are thus efficiently collected in the squarely facing direction, and strong reflected light is returned in the squarely facing direction (on the assumption that there is no interference of a crystal domain positioned upward). Furthermore, it is understood that, even when such a crystal domain is present at another position, Bragg reflection is caused by another incident light 1 directed in parallel to the above-mentioned incident lights 1. At this time, in each of the crystal domains, the normal line of the crystal lattice plane is inclined an angle $\beta$ with respect to Az axis serving as the specified axis and has an azimuth angle $\theta$ (90 degree, here) so that the Bragg reflection conditions in the squarely facing direction are satisfied. Alternatively, it is considered that, when more crystal domains satisfy these conditions, stronger Bragg reflected light in the squarely facing direction is achieved.

On the other hand, a domain illustrated at the lower right of the figure is a crystal domain expressed in a local coordinate system Ax', Ay', Az' and provided with another orientation. In this crystal domain, the normal line of the crystal lattice plane is inclined an angle β with respect to Az' axis (equivalent to Az axis serving as the specified axis) and has an azimuth angle δ (more than 90 degree, here). This crystal domain is formed in such a manner that a crystal domain is rotated a little around Az axis in the counterclockwise direction, whereby an azimuth angle from Ax' axis serving as a reference orientation is made more than 90 degree. In this case, it is considered that, for example, even with the above-mentioned irradiation of incident light 1, the Bragg reflection conditions in the squarely facing direction are not satisfied. Even when the crystal lattice plane is irradiated with incident light 1 along a plane specified with Ay' and Az' axes, said crystal lattice plane having been inclined and rotated is not perpendicular to the plane specified with Ay' and Az' axes (or the normal line does not extend along the plane specified with Ay' and Az' axes). Therefore, the conditions of Bragg reflection in the squarely facing direction are not satisfied, and consequently, Bragg reflected light cannot be emitted at least in the squarely facing direction. It should be noted that such handling is theoretical, and such conditions of Bragg reflection do not necessarily need to be strictly satisfied, and a certain latitude may be allowed in the substantial conditions for recognizing Bragg reflection. Furthermore, it is highly probable that the quality, a production method, an usage condition, or the like of the sheet of colloidal crystals immobilized in resin 100 causes the Bragg reflection conditions to be somewhat shifted.

Figure 6:
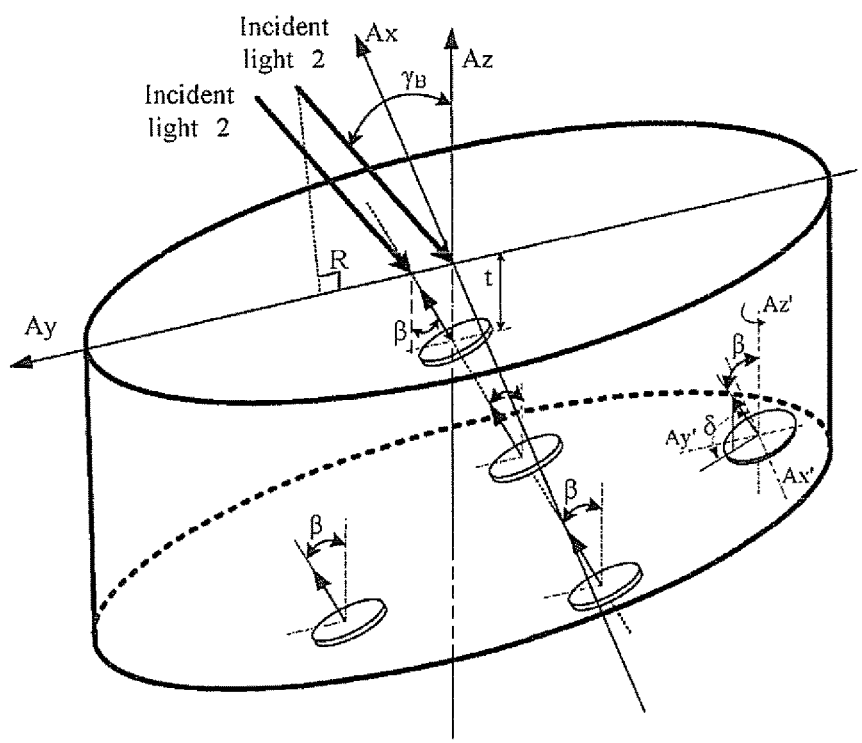
FIG. 6 is a schematic diagram illustrating measurement of back reflection spectrum in the target area.

FIG. 6 schematically illustrates how each of the crystal domains contributes to Bragg back reflection when a specific point in the surface of the target area 12 in FIG. 4 (that is, the sheet surface) is irradiated with incident light 2.

Figure 9:
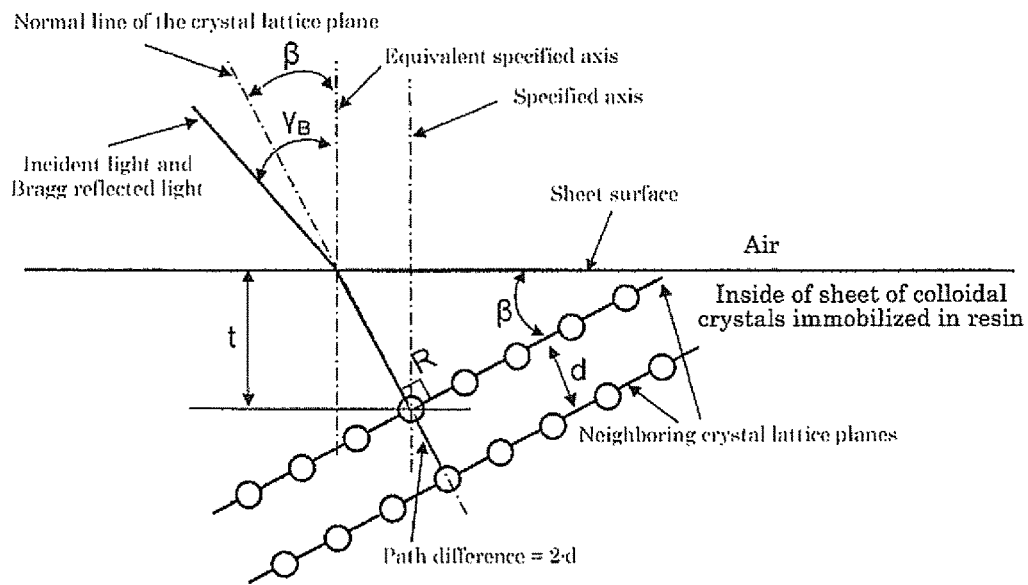
FIG. 9 is a schematic diagram illustrating crystal lattice planes of a crystal domain in the sheet of colloidal crystals immobilized in resin according to the present invention.

Here, Bragg back reflection denotes Bragg reflection in which light perpendicularly entering a crystal lattice plane is reflected perpendicularly to the crystal lattice plane so as to travel backward along the path of the incident light. Here is shown, for example, a case of θ=90 degree (a case in which a shearing direction is a reference orientation and parallel to Ax axis) wherein incident light 2 enters at an incident angle $\gamma_B$ with respect to Az axis, and the azimuth angle θ of the incident light 2 is 90 degree (that is, the incident light 2 is directed along a plane specified with Ay and Az axes (or within the plane)). In the target area, there are illustrated schematic figures of four crystal domains capable of contributing to Bragg back reflection by such incident light 2. The normal line of the crystal lattice plane of each of the crystal domains is illustrated by an up-arrow, and each of the normal lines is inclined an angle β with respect to the specified axis Az or an axis parallel to the specified axis Az. Furthermore, each of the normal lines extends along the plane specified with Ay and Az axes (or within the plane), and an angle θ corresponding to what is called an azimuth angle is 90 degree (as is the case with FIG. 8). Therefore, as illustrated in FIG. 9 (a cross-sectional view taken along a specified normal line plane), Bragg back reflected light can be emitted so as to travel backward along the path of incident light 2 (hence, these domains are regarded as inclined back-reflecting crystal-domains). In particular, incident light 2 entering a certain incident point on Ay axis at an incident angle $\gamma_B$ with respect to Az axis serving as the specified axis enters the target area 12 at the refraction angle β, and the crystal lattice plane to cause Bragg back reflection is irradiated with the incident light 2, and Bragg reflected light travels backward along the path of the incident light 2. Here, a crystal domain penetrated by the incident light 2 and positioned at the shallowest depth t causes Bragg back reflection as illustrated in FIG. 9. Furthermore, crystal domains that are positioned below the above-mentioned crystal domain present at the shallowest depth are irradiated with the same incident light 2, and cause Bragg back reflection likewise. It is considered that, on the assumption that there is no interference of a crystal domain positioned upward, more efficient back reflection of the same incident light 2 can be caused, thereby allowing reflected light of higher intensity to be emitted.

At this time, in each of the crystal domains, the normal line thereof is inclined an angle β with respect to Az axis serving as the specified axis (including a local axis), and an angle θ corresponding to what is called an azimuth angle is 90 degree. A crystal domain illustrated at the lower left of the figure has the same inclination and the same azimuth angle, and therefore, as is the case with FIG. 5, the same back reflection of incident light 2 entering at another incident point is expected.

On the other hand, a domain illustrated at the lower right of the figure is a crystal domain expressed in a local coordinate system Ax', Ay', Az' and provided with another orientation. In this crystal domain, the normal line of the crystal lattice plane is inclined an angle β with respect to Az' axis (equivalent to Az axis serving as the specified axis) and has an azimuth angle δ (more than 90 degree, here). This crystal domain is formed in such a manner that a crystal domain is rotated a little around Az axis in the counterclockwise direction, whereby an azimuth angle from Ax' axis serving as a reference orientation is made more than 90 degrees. In this case, it is considered that, even with the above-mentioned irradiation of incident light 2, the Bragg back reflection conditions are not satisfied. Even when the crystal lattice plane is irradiated with incident light 2 along the plane specified with Ay' and Az' axes, said crystal lattice plane having been inclined and rotated is not perpendicular to the plane specified with Ay' and Az' axes (or the normal line does not extend along the plane specified with Ay' and Az' axes). Therefore, the Bragg back reflection conditions are not satisfied, and consequently, Bragg reflected light cannot be emitted backward. It should be noted that such handling is theoretical, and such Bragg reflection conditions do not necessarily need to be strictly satisfied, and a certain latitude may be allowed in the substantial conditions for recognizing Bragg reflection. Furthermore, it is highly probable that the quality, a production method, an usage condition, or the like of the sheet of colloidal crystals immobilized in resin 100 causes the Bragg reflection conditions to be somewhat shifted.

Figure 7:
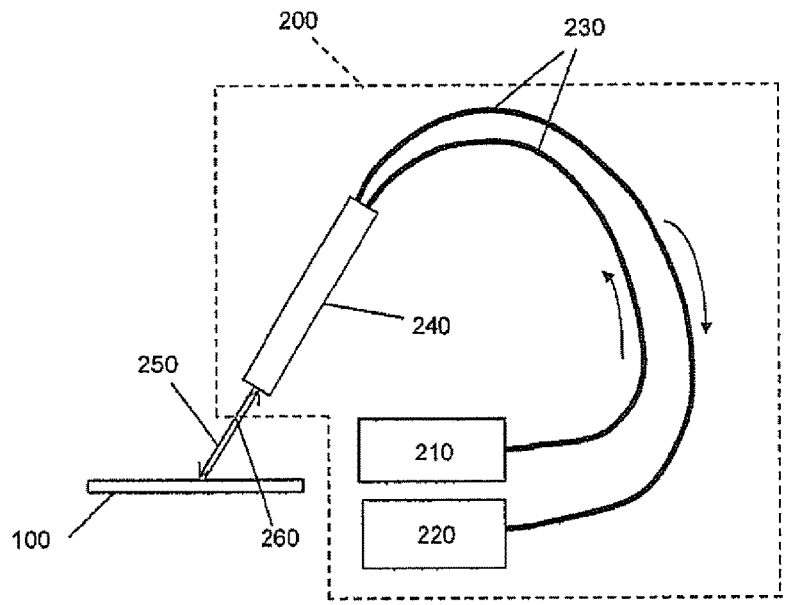
FIG. 7 is a diagram illustrating an optical system to measure back reflection spectrum of the sheet of colloidal crystals immobilized in resin.
Figure 10:
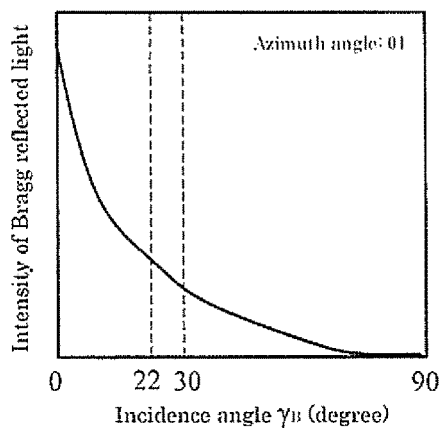
FIG. 10 is a schematic diagram illustrating a result of a distribution of intensity of Bragg back reflection as a function of incident angle.
Figure 11:
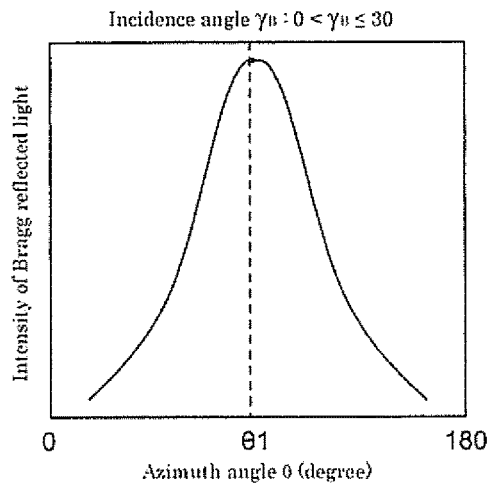
FIG. 11 is a schematic diagram illustrating a result of a distribution of intensity of Bragg back reflection as a function of azimuth angle.

FIG. 7 is a diagram illustrating an optical system to measure back reflection spectra of a sheet of colloidal crystals immobilized in resin. FIGS. 8 to 11 are schematic diagrams illustrating the crystal lattice planes of crystal domains of the sheets of colloidal crystals immobilized in resin according to the present invention (FIGS. 8 and 9), and schematic diagrams illustrating the results of distribution of intensity of Bragg back reflection as a function of angle, obtained by the back reflection spectrum measurement (FIGS. 10 and 11).

The sheet of colloidal crystals immobilized in resin 100 according to the present invention includes a plurality of crystal domains each having a crystal lattice plane inclined with respect to the sheet surface as illustrated in FIGS. 8 and 9, whereby an effect different from a structural color of an existing colloidal crystal can be exhibited. The presence of such plurality of crystal domains can be confirmed by the characteristics shown in FIGS. 10 and 11 in a Bragg back reflection intensity measurement performed by a back reflection spectrum measurement illustrated in FIG. 7.

First, with reference to FIGS. 4 and 7, the back reflection spectrum measurement will be described in detail. To express specific directions with respect to the sheet surface, such as the direction of the incidence axis of irradiation light to the sheet surface and the direction of the reflection axis of reflected light from the sheet surface, an angle $\gamma_B$ with respect to the specified axis and an azimuth angle $\theta$ can be used.

As mentioned above, an azimuth angle $\theta$ characterizes the orientation of an inclined back-reflecting crystal-domain and the orientation of incident light, and in consideration of the fact that the shearing treatment is a reciprocating motion, an azimuth angle of 0 degree is equivalent to an azimuth angle of 180 degree. That is, when all angles in a range of from 0 degree to 180 degree are covered as an azimuth angle $\theta$ of incident light, it follows that irradiation is performed at all azimuth angles $\theta$, and hence, it can be considered that a back reflection spectrum measurement is carried out in all azimuth angle directions of the sheet of colloidal crystals immobilized in resin 100. Furthermore, the irradiation of incident light at an angle $\gamma_B$ in a range of not less than 0 degree and not exceeding 90 degree with respect to the specified axis means the irradiation thereof at all the angles, and hence, it can be considered that a back reflection spectrum measurement is carried out in all azimuth angle directions of the sheet of colloidal crystals immobilized in resin 100. It should be noted that, in the back reflection spectrum measurement, an angle (incident angle) formed by incident light and the specified axis coincides with an angle (reflection angle) formed by reflected light and the specified axis, and therefore, for the sake of simplicity, only an incident angle $\gamma_B$ is indicated as long as no confusion would be caused.

As illustrated in FIG. 7, a back reflection spectrum measurement is performed using a coaxial fiber spectrometer 200. The coaxial fiber spectrometer 200 comprises a light source 210 and a spectrometer 220. The light source 210 is an arbitrary light source that emits white light. The spectrometer 220 is an arbitrary spectrometer that reads the wavelength and intensity of the spectrum of received light. Illumination light emitted from the light source 210 is applied from a fiber head 240 via an optical fiber 230 onto a sheet of colloidal crystals immobilized in resin 100 serving as a test sample. The fiber head 240 receives only light 260 (namely, back reflected light) that is reflected off the test sample in a direction opposite to the irradiation light 250, and the received light is directed, as detection light, to the spectrometer 220 via the optical fiber 230. In the coaxial fiber spectrometer 200, optic axes, namely an illumination axis and a light receiving axis, are overlapped.

FIGS. 8 and 9 are schematic views illustrating the crystal lattice planes of crystal domains in the sheet of colloidal crystals immobilized in resin according to the present invention. FIG. 10 is a schematic view illustrating the dependence of Bragg back reflection intensity on incident angle (an angle with respect to the specified axis) in the sheet of colloidal crystals immobilized in resin according to the present invention when an azimuth angle 9 is a predetermined angle 91. FIG. 11 is a schematic view illustrating the dependence of Bragg back reflection intensity on azimuth angle when an incident angle $\gamma_B$ is any angle throughout a range of from more than 0 degree and not exceeding 30 degree in the sheet of colloidal crystals immobilized in resin according to the present invention.

In the target area 12 including at least a part of the surface of the sheet of colloidal crystals immobilized in resin 100 according to the present invention, when the squarely facing direction perpendicular to said surface is defined as the specified axis Az, the target area 12 includes a plurality of inclined back-reflecting crystal-domains including crystal lattice planes capable of Bragg back reflection of at least a part of incident light having an incident angle $\gamma_B$ of more than 0 degree with respect to the specified axis (Condition (1)). Examples of such inclined back-reflecting crystal-domains include the following domain. As schematically illustrated in FIGS. 8 and 9, when an angle $\beta$ formed by the specified axis (corresponding to the normal line of the sheet surface) and the normal line of the crystal lattice plane in a crystal domain (or an angle $\beta$ formed by the crystal lattice plane and the sheet surface) is not 0 degree, the crystal lattice plane is inclined to the sheet surface, and accordingly, allows Bragg back reflection of incident light from a direction other than the squarely facing direction, and hence, this crystal domain can be regarded as an inclined back-reflecting crystal-domain. For example, when there is present a crystal domain including a crystal lattice plane having an angle $\beta$ of more than 0 degree and not exceeding 15 degree, it can be considered that Condition (1) is satisfied. Condition (1) allows Bragg reflection to be observed without overlapping of the illumination axis of illumination light and the observation axis of an observer facing the sheet surface of the sheet of colloidal crystals immobilized in resin according to the present invention.

Furthermore, in the sheet of colloidal crystals immobilized in resin according to the present invention, when an azimuth angle $\theta$ is defined around the specified axis Az, a plurality of inclined back-reflecting crystal-domains satisfying the above-mentioned Condition (1) is azimuthally oriented so that the intensity of reflected light caused by Bragg back reflection varies in dependent on the azimuth angle of incident light (Condition (2)). This allows the sheet of colloidal crystals immobilized in resin according to the present invention to cause the strong color development of a structural color. For example, in the case where a back reflection spectrum measurement is performed at a certain incident angle in the azimuth angle direction at least in a range of from 0 to 90 degree (more preferably in a range of from 0 to 180 degree (still more preferably to 360 degree)), and as a result, if no variation in the intensity of light corresponding to Bragg back reflection is observed, it can be considered that an azimuthal orientation is not present. Here, "no variation in the intensity" can denote that, under consideration of experimental errors and the like, a significant difference in the intensity is not observed.

Here, a theoretical relationship between an angle $\beta$ formed by the normal line of a crystal lattice plane and the specified axis and an incident angle $\gamma$ of illumination light to be Bragg-reflected in the squarely facing direction (an angle formed by a straight line representing incident light and the specified axis) is described to explain the appropriateness of the range of the angle $\beta$. It is assumed that, under consideration of a refractive index n of the sheet of colloidal crystals immobilized in resin, Snell's law holds between the angle $\beta$ and the incident angle $\gamma$ of illumination light. It should be noted that, in the case where a measurement is performed using the normal line of the sheet surface (corresponding to the specified axis) as a reference, the incident angle and the refraction angle of illumination light are γ and 2β, respectively.

As shown in FIG. 8, assuming the refractive index of the air is one (1), the refractive index n is given by:

$$n = \sin(\gamma)/\sin(2\beta).$$

Then, the formula is solved for γ and β as follows.

$$\gamma = \arcsin[n \cdot \sin(2\beta)] \tag{1}$$

$$\beta = 0.5 \arcsin\{(1/n)\sin(\gamma)\} \tag{2}$$

For example, when a crystal lattice plane is parallel to the sheet surface, β (degree)=0, and accordingly, γ (degree)=0 is derived from Equation (1), and hence, the normal line of the crystal lattice plane coincides with a straight line representing illumination light, and the illumination axis and the observation axis of an observer facing the sheet surface are overlapped.

Therefore, when a sheet of colloidal crystals immobilized in resin has a crystal lattice plane inclined to the sheet surface, that is, has an angle β of at least 0 degree or more, the angle β (degree)>0 is always satisfied, where the angle β is formed by the normal line of the crystal lattice plane and the specified axis, and hence, according to Equation (1), an incident angle of illumination light γ (degree)>0 is always satisfied. As a result, oblique incidence with respect to the sheet surface allows Bragg reflection in the squarely facing direction to be achieved without overlapping of the illumination axis and the observation axis. However, at a point where the angle β is close to 0 degree, the incident angle γ of illumination light is also close to 0 degree, and accordingly, the difference between the observation axis and the lighting axis is smaller, and said axes substantially tend to be overlapped.

Hence, the lower limit of the angle β under Condition (1) is more than 0 degree. It should be noted that, as long as the sheet of colloidal crystals immobilized in resin according to the present invention has a crystal domain satisfying Condition (1), the above-mentioned effect can be achieved, and therefore, it is not a problem that, besides the crystal domain satisfying Condition (1), the sheet has a crystal domain having an angle β of 0 degree.

As shown in Equation (2), an angle β is dependent on a refractive index n, and therefore, in consideration of the refractive index n, the angle β is determined. The refractive index n of the sheet of colloidal crystals immobilized in resin is approximately given by the following equation.

$$n = C\, n_p + (1-C) n_m$$

C represents the volume fraction concentration of particles (particle concentration), $n_p$ represents the refractive index of particles, and $n_m$ represents the refractive index of a resin in which particles are filled and immobilized. A particle typically employed and having the lowest refractive index is a silica particle, and the refractive index thereof is 1.45. Furthermore, a resin typically employed and having the lowest refractive index is silicone resin, and the refractive index thereof is 1.45. Particle or resin materials practically employed often have a higher refractive index than the above-mentioned value, and hence, the refractive index $n_p$ of the above-mentioned particles is not less than 1.45, and the refractive index $n_m$ of the above-mentioned resin is also not less than 1.45.

Here, as oblique irradiation that is practically employed, a case of an incident angle γ (degree)=45 will be examined. When Equation (2) is solved with the refractive index n≥1.45, an angle β (degree)≤14.6 is obtained wherein the angle β is formed by the normal line of a crystal lattice plane and the specified axis.

Thus, in consideration of product errors (±2 degree) and the like, it is appropriate to set the upper limit of an angle β under Condition (1) to 15 degree. It should be noted that, as long as the sheet of colloidal crystals immobilized in resin according to the present invention has a crystal domain satisfying Condition (1), the above-mentioned effect can be achieved, and therefore, it is not a problem that, besides the crystal domain satisfying Condition (1), the sheet has a crystal domain having an angle β of more than 15 degree.

According to Equation (2), when γ is increased from 0 degree to 90 degree, β increases from 0 degree and reaches the maximum (regarded as $\beta_0$) when γ is 90 degree. The $\beta_0$ is obtained by the following equation:

$$\beta_0 = 0.5 \arcsin(1/n) \tag{3}$$

This condition, γ (degree)=90, corresponds to a condition of the total reflection of light from the side of the sheet of colloidal crystals immobilized in resin.

This suggests that the normal line of a crystal lattice plane that causes Bragg reflection in the squarely facing direction has an angle β of from 0 degree to $\beta_0$, and a crystal lattice plane in which the normal line has an angle of not less than $\beta_0$ with respect to the specified axis cannot contribute to Bragg reflection in the squarely facing direction. Here, when Equation (3) is solved with the refractive index n≥1.45, $\beta_0$ (degree)≤21.8 is obtained.

Therefore, in consideration of product errors (±2 degree) and the like, the upper limit of an angle β under Condition (1) is preferably set to 20 degree. This allows Bragg reflection in the squarely facing direction to be observed even in the case of much more oblique irradiation (incident angle>45 degree) than light irradiation at an incident angle of 45 degree that is typically employed as oblique irradiation. Here again, as long as the sheet of colloidal crystals immobilized in resin according to the present invention has a crystal domain satisfying the condition that an angle β is more than 0 degree and not exceeding 20 degree, the above-mentioned effect can be obtained, and therefore, it is not a problem that, besides the crystal domain satisfying these conditions, the sheet has a crystal domain having an angle β of more than 20 degree.

Hence, it follows that, in the sheet of colloidal crystals immobilized in resin according to the present invention, an angle β may be preferably any angle of more than 0 degree and not exceeding 15 degree with respect to the specified axis. Furthermore, the sheet may include a crystal domain having a crystal lattice plane having a normal line characterized by such angle β.

Next, there will be described a method of measuring an angle β formed by the specified axis and the normal line of a crystal lattice plane inclined with respect to the sheet surface of the sheet of colloidal crystals immobilized in resin according to the present invention. The angle β formed by the specified axis and the normal line of the crystal lattice plane can be obtained by measuring the incident angle of incident light that causes Bragg back reflection (the incident angle coincides with a refraction angle obtained when Bragg-back-reflected light leaves the sheet surface.). With reference to FIG. 9, a theoretical relationship between an incident angle $\gamma_B$ in Bragg back reflection and an angle β formed by the normal line of a crystal lattice plane and the specified axis will be described. It is assumed that, under consideration of a refractive index n of the sheet of colloidal crystals immobilized in resin, Snell's law holds between the incident angle $\gamma_B$ and the angle $\beta$. As shown in FIG. 9, the refractive index n is:

$$\sin(\gamma_B)/\sin(\beta)=n,$$

whereby $\beta$ and $\gamma_B$ are determined as follows:

$$\beta=\arcsin\{(1/n)\sin(\gamma_B)\} \quad (4)$$

$$\gamma_B=\arcsin\{n\cdot\sin(\beta)\} \quad (5)$$

That is, it can be said that, in the case where Bragg back reflection occurs at the incident angle $\gamma_B$, there is present a crystal lattice plane whose normal line forms the angle $\beta$ given by Equation (4) with the specified axis. For example, with reference to FIGS. 25A to 25C for later-mentioned Example 1, a refractive index n of the sheet of colloidal crystals immobilized in resin=1.48 is obtained from silica particle refractive index $n_p$=1.45, acrylic resin refractive index $n_m$=1.49, and a particle concentration of 17% by volume, whereby angles $\beta$ (degree)=20, 13, and 7 (including ±2 degree errors), corresponding to incident angles $\gamma_B$ (degree)=30, 20, and 10, respectively, can be obtained.

Furthermore, a back reflection spectrum measurement makes it possible to determine whether or not the sheet of colloidal crystals immobilized in resin has a crystal domain satisfying the above-mentioned Conditions (1) and (2).

In Equation (5), for the sake of simplicity, the refractive index n is set to 1.45 and the angle $\beta$ is set to be in a range of more than 0 degree and not exceeding 15 degree, the range being included in Condition (1), whereby the incident angle YB of incident light is calculated to be in more than 0 degree and not exceeding 22 degree. Hence, it follows that, when back reflection spectrum measurements are performed at a predetermined azimuth angle θ1 of the sheet surface throughout the entire range of the incident angle $\gamma_B$ of light to the sheet of colloidal crystals immobilized in resin of more than 0 degree and not exceeding 22 degree, if the intensity of Bragg reflection is not 0, the above-mentioned Condition (1) is satisfied as shown in FIG. 10. At this time, incident light enters the sheet of colloidal crystals immobilized in resin at an incident angle $\gamma_B$ different from that in FIG. 8, and perpendicularly enters the crystal lattice plane of the sheet, and hence, according to Bragg equation, while the interplanar spacing d is constant, the incident angle to the crystal lattice plane is changed, and accordingly, the wavelength of light that satisfies the conditions of Bragg reflection changes. That is, it is expected that the wavelength of Bragg reflected light that is detected by a back reflection spectrum measurement is different from the wavelength of Bragg reflected light reflected in the squarely facing direction of the sheet surface. Furthermore, according to Equation (5), when an angle $\beta$ is set to more than 0 degree and not exceeding 20 degree, an angle $\gamma_B$ of incident light in a range of more than 0 degree and not exceeding 30 degree is obtained, and, when the intensity of Bragg back reflection is not 0 throughout the entire range of the incident angle of more than 0 degree and not exceeding 30 degree, it can be considered that the incident angle is in a more preferable range in the above-mentioned Condition (1). It should be noted that, in the case where the sheet of colloidal crystals immobilized in resin according to the present invention is produced by the shearing treatment, a predetermined azimuth angle θ1 may be set so as to coincide with a direction perpendicular to the shearing direction. Here, a state in which the intensity of Bragg reflection is not 0 may denote that, under consideration of noise in a typical detector available at the time of the patent application of the present invention, the intensity of light caused by Bragg reflection and reflected from the sheet of colloidal crystals immobilized in resin is higher than the detection limit. Furthermore, light caused by Bragg reflection has a wavelength peculiar to Bragg reflection, and hence, such light can be identified by the wavelength thereof (or the color of the light that corresponds to such wavelength). Specifically, refer to a luminescent color in the later-mentioned embodiments of the present invention.

When inclined back-reflecting crystal-domains are oriented in a specific orientation, inclined back-reflecting crystal-domains including a crystal lattice plane having that orientation are present in higher proportion, and the intensity of Bragg back reflection on the crystal lattice planes having that orientation is stronger accordingly. Therefore, with an azimuth angle specified in the counterclockwise direction with respect to the specified axis and taken as a variable, a back reflection spectrum measurement is performed throughout the entire range of the incident angle $\gamma_B$ of incident light to the sheet of colloidal crystals immobilized in resin of at least more than 0 degree and not exceeding 22 degree. This allows the azimuth angle dependence of Bragg back reflection in the sheet of colloidal crystals immobilized in resin to be examined. It can be said that, when the intensity of Bragg back reflection has a peak at a certain azimuth angle, the above-mentioned Condition (2) is satisfied. It should be noted that, throughout the entire range of incident angle $\gamma_B$ of more than 0 degree and not exceeding 30 degree, the azimuth angle dependence of Bragg back reflection in the sheet of colloidal crystals immobilized in resin can be examined likewise. At this time, in the case where the intensity of Bragg reflection has a peak at a predetermined azimuth angle θ1 throughout the above-mentioned entire range as illustrated in FIG. 11, it can be said that a crystal domain (inclined back-reflecting crystal-domains) having a crystal lattice plane satisfying the Bragg back reflection conditions are oriented in the direction of a predetermined azimuth angle θ1 at an arbitrary incident angle $\gamma_B$ of incident light in a range of more than 0 degree and not exceeding 30 degree. Here, the orientation related to the azimuth angle is tried to be discussed with reference to the relationship with the shearing treatment. In azimuth-oriented crystals in FIG. 2C, in the cross section, there is not particularly observed a tendency for the normal lines of the crystal lattice planes to be oriented perpendicular to the sheet surface. That is, a crystal lattice plane inclined to the sheet surface is present, and hence, there is present a crystal domain having the crystal lattice plane satisfying the conditions of facing Bragg reflection as illustrated in FIG. 8 or FIG. 9. On the other hand, in the sheet surface, it is observed that arrows to specify a crystal domain direction relative to the shearing direction have a tendency. In the case where such tendency is observed, it can be said that an orientation is present. This is caused by the shearing treatment performed in a specific shearing direction, and hence, it could be said that such a shearing treatment leads to the orientation. Practically, the presence or absence of such orientation can be determined by the above-mentioned method.

As shown in the later-mentioned embodiments (for example, FIGS. 24B and 26B), as the incident angle $\gamma_B$ of incident light is closer to 0 degree, the intensity of Bragg reflection increases, and hence, crystal domains including a crystal lattice plane in which an angle $\beta$ formed by the normal line of the crystal lattice plane and the specified axis is close to 0 degree are present in higher proportion. Hence, it follows that, for the sake of simplicity, a back reflection spectrum measurement does not have to be performed throughout the entire range of incident angle $\gamma_B$ of incident light of more than 0 degree and not exceeding 30 degree, and for example, aback reflection spectrum measurement to examine the dependence on azimuth angle may be performed at some angles of, for example, 30 degree, 20 degree, and 10 degree. If a crystal lattice plane having an angle β of 20 degree, the angle β being formed by the normal line of the crystal lattice plane and the specified axis (corresponding to an incident angle $\gamma_B$ of incident light of 30 degree), tends to have a predetermined azimuth angle, it can be assumed that, likewise, a crystal lattice plane having an angle β of more than 0 degree and less than 20 degree also tends to have the predetermined azimuth angle θ1. Actually, as shown in the later-mentioned embodiment (for example, FIGS. 25A to 25C), also in the case where the incident angle $\gamma_B$ of incident light is more than 0 degree and not exceeding 30 degree, the intensity of Bragg back reflection reaches the maximum at the predetermined azimuth angle θ1.

It should be noted that, for the sake of simplicity, FIGS. 10 and 11 illustrate a case where the direction of shearing is set at a reference orientation (direction) for measuring an azimuth angle θ, and θ1 is 90 degree (a direction perpendicular to the shear direction).

Thus, in the sheet of colloidal crystals immobilized in resin 100 including a plurality of crystal domains, a target area has inclined back-reflecting crystal-domains satisfying Conditions (1) and (2) according to the present invention.

In the case where a sheet of colloidal crystals immobilized in resin is produced by a method including the shearing treatment step to be mentioned later, when shearing force is exerted in the shearing direction being parallel to the surface in a target area and serving as a reference of azimuth angle, the sheet of colloidal crystals immobilized in resin 100 according to the present invention that certainly satisfies Conditions (1) and (2) can be obtained. Specifically, under Condition (2), at least one peak azimuth angle obtained by a Bragg back reflection measurement is in a range of from not less than 80 degree and not exceeding 100 degree, and more preferably substantially 90 degree (that is, a direction perpendicular to the shearing direction).

In the case of colloidal crystals of non-oriented polycrystals described in Non-patent Reference 1, the directions of crystal domains are not oriented in a specific direction, and hence, it is expected that Condition (1) is satisfied, whereas Condition (2) is not satisfied. On the other hand, in the case of oriented colloidal crystals described in Patent Reference 1 and Non-patent Reference 2, crystal domains are so oriented that a specific crystal lattice plane is parallel to the sheet surface, and hence, it is expected that both Conditions (1) and (2) are not satisfied. That is, colloidal crystals of the sheet of colloidal crystals immobilized in resin 100 according to the present invention are novel colloidal crystals having a different structure and different characteristics from those of colloidal crystals of non-oriented polycrystals and conventional oriented colloidal crystals.

It should be noted that, in FIG. 1A, the sheet of colloidal crystals immobilized in resin 100 according to the present invention is illustrated to have gaps between crystal domains 110, but, is not limited to this. The crystal domains 110 may be arranged without gaps therebetween. Furthermore, it shall be understood that, to satisfy the above-mentioned Conditions (1) and (2), a plurality of the crystal domains 110 is so arranged that the crystal lattice planes of the domains are in a state illustrated in FIG. 8 or 9.

In the sheet of colloidal crystals immobilized in resin 100 according to the present invention, the particle concentration of colloidal particles 130 is preferably not less than 2% by volume and not exceeding 35% by volume. When the particle concentration exceeds 35% by volume, the production of the sheet of colloidal crystals immobilized in resin becomes difficult, and there is a possibility of failing to obtain desired characteristics. When the particle volume concentration is less than 2% by volume, sometimes colloidal crystals are not formed in a liquid colloidal dispersion. The particle concentration is more preferably not less than 5% by volume and not exceeding 25% by volume, and such particle concentration allows desired characteristics to be obtained throughout the entire sheet. The particle concentration is still more preferably not less than 10% by volume and not exceeding 20% by volume, and such particle concentration allows desired characteristics to be surely obtained throughout the entire sheet.

The sheet thickness of the sheet of colloidal crystals immobilized in resin 100 according to the present invention is preferably more than 0.3 mm and not exceeding 10 mm. When the sheet thickness is not exceeding 0.3 mm, colloidal crystals having a specific crystal lattice plane that is oriented parallel to the sheet surface could be formed, and accordingly, sometimes desired characteristics cannot be obtained. When the sheet thickness is more than 10 mm, the production of the sheet becomes difficult. The sheet thickness is more preferably not less than 0.5 mm and not exceeding 5 mm. Such sheet thickness allows desired characteristics to be surely obtained when the sheet of colloidal crystals immobilized in resin 100 is produced by the shearing treatment. The sheet thickness is still more preferably not less than 0.7 mm and not exceeding 3 mm. Such sheet thickness allows desired characteristics to be surely obtained throughout the entire sheet of colloidal crystals immobilized in resin.

Furthermore, in the sheet of colloidal crystals immobilized in resin 100 according to the present invention, Bragg reflection occurs even under an angle condition (a non-regular reflection condition) deviated from a regular reflection condition in the sheet surface, and accordingly, a structural color by Bragg reflection can be observed without overlapping of the surface reflected light of illumination light and Bragg reflected light. Thus, the use of the sheet of colloidal crystals immobilized in resin 100 according to the present invention allows an effect of clearer color development to be produced than in the case of using existing colloidal crystals.

Besides the inclined back-reflecting crystal-domains satisfying the above-mentioned Conditions (1) and (2), the target area of the sheet of colloidal crystals immobilized in resin 100 according to the present invention may include different crystal domains to the extent that Conditions (1) and (2) are not affected. Alternatively, besides the inclined back-reflecting crystal-domains, the target area of the sheet of colloidal crystals immobilized in resin 100 according to the present invention may include inorganic solids, such as metal, glass, and ceramics, or organic solids, such as plastics.

Figure 12:
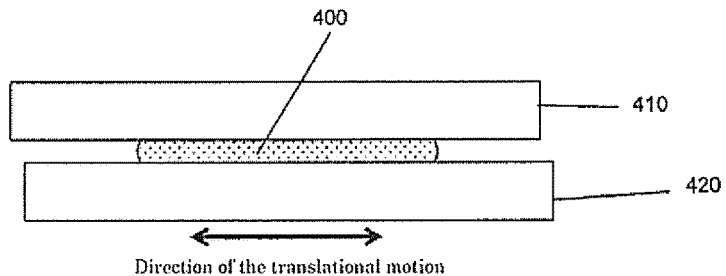
FIG. 12 is a diagram illustrating a state of manufacturing the sheet of colloidal crystals immobilized in resin according to the present invention.

Next, a method of producing the sheet of colloidal crystals immobilized in resin 100 according to the present invention will be described. FIG. 12 is a diagram illustrating a state of manufacturing the sheet of colloidal crystals immobilized in resin according to the present invention. The sheet of colloidal crystals immobilized in resin 100 according, to the present invention can be produced by a method including a shearing treatment step. First, a liquid colloidal dispersion is prepared. The liquid colloidal dispersion includes: a liquid dispersion medium comprising a monomer, an oligomer, a macromer, or a combination of these of a compound to be polymerized by ultraviolet irradiation, heating, or the like and thereby form a resin; and colloidal particles dispersed in the liquid dispersion medium. Since the colloidal particles are the same as the colloidal particles 130 (FIG. 1B), a description thereof will be omitted.

An arbitrary compound may be employed if a dispersion medium is in a colloidal crystal state, but, compounds to be polymerized and form an acrylic resin, an epoxy resin, a siloxane resin (silicone), an urethane resin, a polyester resin, an alkyd resin, a fluororesin, and a polyether resin are preferable. Since these resins and compounds to form the resins are the same as the resin 120 (FIG. 1B), a description thereof will be omitted. The dispersion medium may contain an arbitrary polymerization initiator that becomes active by ultraviolet irradiation, heating, or the like.

The particle concentration of the liquid colloidal dispersion is preferably not less than 2% volume and not exceeding 35% by volume. As mentioned above, when the particle concentration exceeds 35% by volume, producing the sheet of colloidal crystals immobilized in resin becomes difficult, and there is a possibility of failing to obtain desired characteristics. When the particle volume concentration is less than 2% by volume, sometimes colloidal crystals are not formed in the liquid colloidal dispersion. The particle concentration is more preferably not less than 5% by volume and not exceeding 25% by volume, and such particle concentration allows desired characteristics to be obtained throughout the entire sheet. The particle concentration is still more preferably not less than 10% by volume and not exceeding 20% by volume, and such particle concentration allows desired characteristics to be surely obtained throughout the entire sheet.

When the thus-prepared liquid colloidal dispersion has a sufficiently low impurity ion concentration, the three-dimensional periodic arrangement of particles is made on an autonomous basis, and the dispersion is in a colloidal crystal state. In the case of a liquid colloidal dispersion having a high impurity ion concentration, bringing the liquid colloidal dispersion into contact with an ion-exchange resin allows the impurity ion concentration to be decreased, and allows the dispersion to fall in a colloidal crystal state.

Next, a thus-prepared colloidal dispersion 400 is sandwiched between two glass plates 410 and 420 that horizontally face each other. One glass plate 410 out of the two is fixed. Then, the other glass plate 420 is imparted vibrational-translational motion linearly in the horizontal direction shown by an arrow in the figure, whereby the sandwiched liquid colloidal dispersion undergoes the shearing treatment. The direction of the vibrational-translational motion is called "shearing direction", and is a direction being parallel to the surface of the above-mentioned target area (the target area 12 in FIG. 4) and serving as a reference of azimuth angle. The distance between the surfaces of the glass plates can be the sheet thickness of the sheet of colloidal crystals immobilized in resin 100 to be obtained, and therefore, is preferably more than 0.3 mm and not exceeding 10 mm.

Here, the conditions of the illustrated vibrational-translational motion are as follows. These conditions allow crystal domains of the liquid colloidal dispersion 400 to be made into inclined back-reflecting crystal-domains that satisfy Conditions (1) and (2) at least in the target area.

Vibration frequency: 5 to 100 Hz
Vibration amplitude: 1 to 5 times the distance between the surfaces
Processing time: 10 seconds to 10 minutes More preferably, the conditions of the illustrated vibrational-translational motion are as follows. These conditions allow crystal domains of the liquid colloidal dispersion 400 to be made into inclined back-reflecting crystal-domains that surely satisfy Conditions (1) and (2) at least in the target area.

Vibration frequency: 7 to 20 Hz
Vibration amplitude: 1.5 to 2.5 times the distance between the surfaces
Processing time: 30 seconds to 2 minutes It should be noted that the vibration amplitude may be 1 to 3 times the distance between the surfaces.

After the liquid colloidal dispersion undergoes the shearing treatment, the dispersion medium is polymerized by ultraviolet irradiation, heating, or the like. The sheet of colloidal crystals immobilized in resin 100 according to the present invention is thus obtained.

Embodiment 2

In Embodiment 2, there will be described a method of displaying a structural color by using the sheet of colloidal crystals immobilized in resin described in Embodiment 1.

Figure 13:
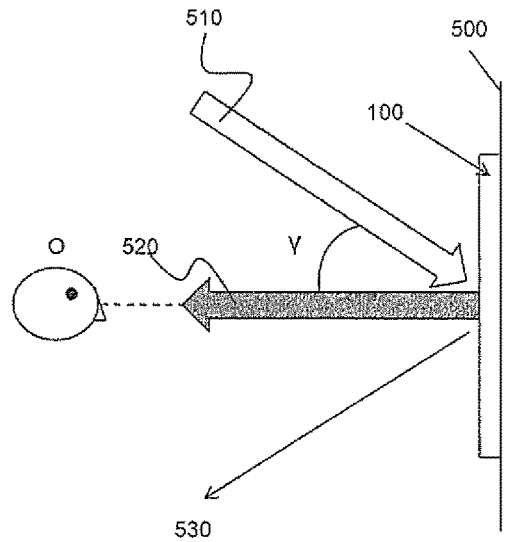
FIG. 13 is a schematic diagram illustrating how a structural color is displayed according to the present invention.

FIG. 13 is a schematic diagram illustrating how a structural color according to the present invention is displayed. In FIG. 13, the sheet of colloidal crystals immobilized in resin 100 described in Embodiment 1 is attached onto a wall 500, and an observer O observes the sheet of colloidal crystals immobilized in resin 100 from a direction squarely facing the sheet surface. The method of displaying a structural color based on colloidal crystals includes the step of irradiating illumination light 510 on the sheet of colloidal crystals immobilized in resin 100. The light source of the illumination light 510 is an arbitrary illuminator, such as a light emitting diode element (LED), a fluorescent lamp, or an incandescent lamp, or natural illumination, such as sunlight. These illuminators may be an existing interior illumination apparatus having been installed.

Specifically, the step of irradiating illumination light 510 is such that illumination light 510 is irradiated on the sheet of colloidal crystals immobilized in resin 100 from a direction different from a direction squarely facing the sheet surface of the sheet of colloidal crystals immobilized in resin 100. Such configuration allows the observer O to observe Bragg reflected light 520 without overlapping of the observation axis of the observer O and the illumination axis of illumination light 510 and without overlapping of surface reflected light 530 of the illumination light 510 and Bragg reflected light 520. More preferably, in the step of irradiating illumination light 510, the direction to emit the illumination light is, for example, a direction perpendicular to the shearing direction in the case where the sheet of colloidal crystals immobilized in resin is produced by the shearing treatment. This allows the observer O to observe strong color development caused by Bragg reflected light 520.

In the step of irradiating illumination light 510, the illumination light 510 is irradiated on the sheet of colloidal crystals immobilized in resin 100 at an incident angle γ in a range of from 30 degree to 60 degree (preferably not less than 30 degree and not exceeding 45 degree). This range allows the observer O to surely observe strong color development caused by Bragg reflected light 520. The incident angle γ illustrated in FIG. 13 is the same as the incident angle γ illustrated in FIG. 5. For example, in FIG. 13, when the sheet of colloidal crystals immobilized in resin 100 has a pattern comprising a character or a figure, such pattern can be effectively displayed for the observer O.

Figure 14:
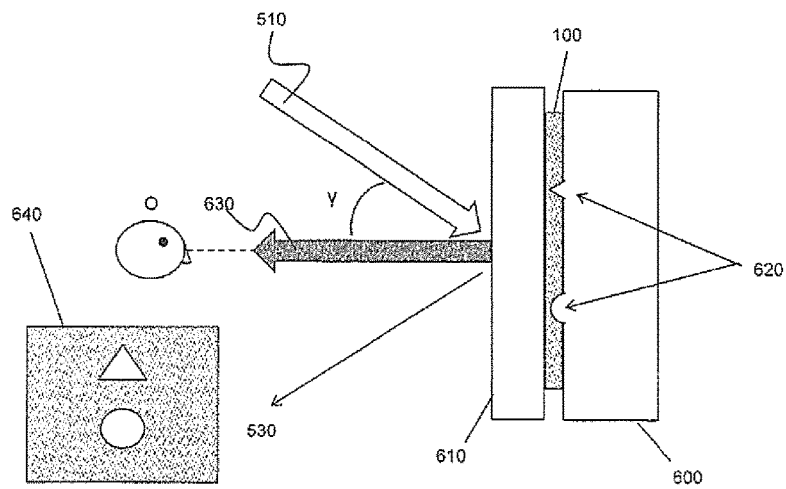
FIG. 14 is another schematic diagram illustrating how a structural color is displayed according to the present invention.

FIG. 14 is another schematic diagram illustrating how a structural color according to the present invention is displayed. In FIG. 14, the sheet of colloidal crystals immobilized in resin 100 described in Embodiment 1 is attached onto a relief plate 600, and an observer O observes the sheet of colloidal crystals immobilized in resin 100 from a direction squarely facing the sheet surface. Here, the resin 120 (FIG. 1B) of the sheet of colloidal crystals immobilized in resin 100 has flexibility and thereby can easily become deformed under a usage environment. Here, the sheet of colloidal crystals immobilized in resin 100 having flexibility enough to easily become deformed denotes that the sheet of colloidal crystals immobilized in resin 100 is in a state in which said sheet can become deformed through a later-mentioned pressing step so as to reflect convex and/or concave of a pattern 620 of the relief plate 600 (Although FIG. 14 illustrates a pattern comprising only convex, but the pattern 620 is not limited to this and may be a complicated pattern comprising a combination of projections and depressions.).

As illustrated in FIG. 14, the sheet of colloidal crystals immobilized in resin 100 is sandwiched at least between a hard transparent plate 610 and the relief plate 600 that has the pattern 620 comprising a character or a figure and expressed by projections and/or depressions. It is beneficial that both of the relief plate 600 and the hard transparent plate 610 have hardness enough not to easily become deformed, and a material to be used for said plates is not particularly limited. The hard transparent plate 610 is transparent enough to allow a structural color of the sheet of colloidal crystals immobilized in resin 100 to be seen. The illustrated hard transparent plate 610 may be a glass plate, an acrylic resin plate, or a polycarbonate resin plate, but, are not limited to these.

An opaque flexible sheet (not illustrated) may be disposed such that the relief plate 600, the opaque flexible sheet, the colloidal crystals immobilized in resin 100, and the hard transparent plate 610 are aligned in this order. The opaque flexible sheet makes it possible to reduce reflection of light from the relief plate 600 other than Bragg reflected light, and therefore, an observer can observe clearer color development of a structural color. Such opaque flexible sheet is a material capable of fitting the pattern 620 of the relief plate 600, and examples of the sheet include a rubber sheet colored in black or the like, colored cloth, and various resin films. Alternatively, also in the case where a surface of the sheet of colloidal crystals immobilized in resin 100, the surface being in contact with the relief plate 600, is painted over with a colored paint, or in the case where a colored rubber paste or the like is applied to said surface, the same effect as in the case of using the opaque flexible sheet can be produced.

A method, illustrated in FIG. 14, for displaying a structural color based on colloidal crystals may include the step of pressing the sheet of colloidal crystals immobilized in resin 100 with the hard transparent plate 610 prior to the step of irradiating illumination light 510 on the sheet of colloidal crystals immobilized in resin 100. The step of irradiating illumination light is the same as the step described with reference to FIG. 13, and therefore a description thereof will be omitted.

By the pressing step, an area of the sheet of colloidal crystals immobilized in resin 100, the area coming into contact with projections of the pattern 620, is pressed and deformed. As a result, the particle spacing between colloidal particles in the pressed and deformed area is different from the particle spacing between colloidal particles in other areas. It should be noted that the pressing step may be performed by mechanically pressing, for example, tightening a screw using a jig, or by manually pressing the hard transparent plate 610 against the sheet of colloidal crystals immobilized in resin 100.

Next, the step of irradiating illumination light 510 on the sheet of colloidal crystals immobilized in resin 100 is performed. This step makes it possible for an observer O to observe Bragg reflected light 630. Specifically, Bragg reflected light 630 is constituted of Bragg reflected light based on the non-deformed area and Bragg reflected light based on the deformed area. That is, an observer O can recognize the pattern 620 comprising convex and concave (unevenness distribution) as the color distribution 640 of a structural color. In the color distribution 640 of a structural color, an area corresponding to the pattern 620 comprising projections and depressions is a triangle and a circle. As indicated in the color distribution 640 of a structural color, an observer O recognizes that the structural color of a triangle and a circle (that is, the deformed area) is different from the structural color of an area expressed by hatching (that is, the non-deformed area). Here again, the observer O can observe Bragg reflected light 630 without overlapping of the observation axis of the observer O and the illumination axis of illumination light 510 and without overlapping of surface reflected light 530 of the illumination light 510 and Bragg reflected light 630.

As mentioned above, the use of the sheet of colloidal crystals immobilized in resin according to the present invention allows Bragg reflection to occur even under an angle condition (a non-regular reflection condition) deviated from a regular reflection condition in the sheet surface, and accordingly, a structural color caused by Bragg reflection can be observed without overlapping of the surface reflected light of illumination light and Bragg reflected light, and thus, an observer can enjoy the effect of clearer color development by irradiation of illumination light. Pressing of the sheet of colloidal crystals immobilized in resin against a relief plate having convex and/or concave allows an observer to visually recognize an unevenness distribution as a color distribution.

Embodiment 3

Figure 15:
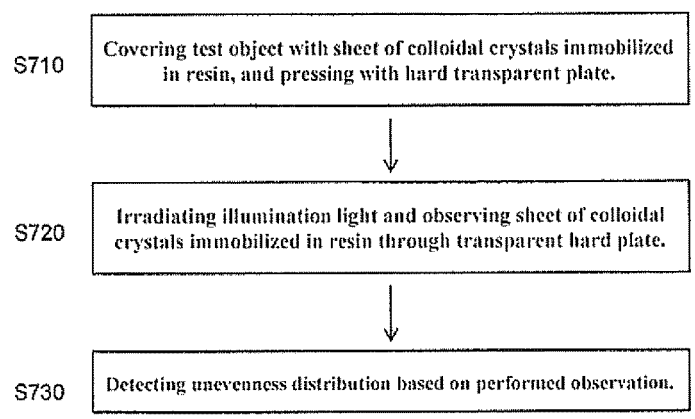
FIG. 15 shows a flowchart illustrating the steps of detecting an unevenness distribution or of a hardness distribution of a test object according to the present invention.
Figure 16:
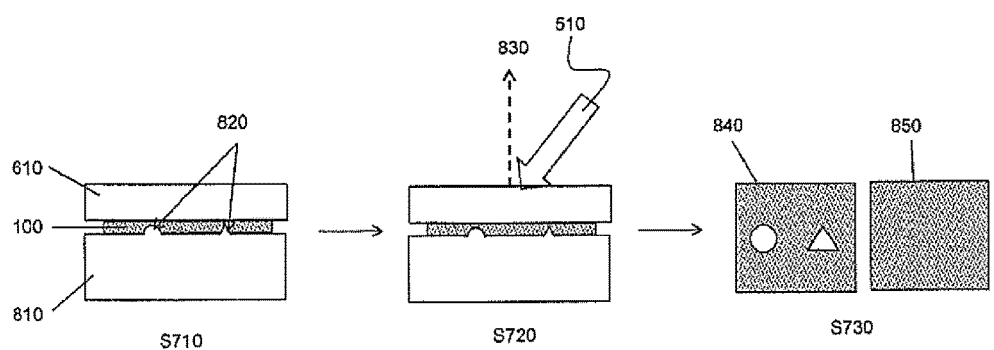
FIG. 16 is a diagram showing procedures indicating the steps of detecting the unevenness distribution of the test object according to the present invention.

In Embodiment 3, a method of detecting the unevenness distribution of a test object using the sheet of colloidal crystals immobilized in resin described in Embodiment 1 is described. FIG. 15 shows a flowchart illustrating the step of detecting the unevenness distribution of a test object according to the present invention. FIG. 16 is a diagram showing procedures indicating the step of detecting the unevenness distribution of a test object according to the present invention.

Step S710: A test object 810 is covered with a sheet of colloidal crystals immobilized in resin 100, and pressed with a hard transparent plate 610. Here, the sheet of colloidal crystals immobilized in resin 100 is the sheet of colloidal crystals immobilized in resin described in Embodiment 1, and a resin in the sheet has flexibility and thereby can easily become deformed under a usage environment. It is beneficial that both of the measurable test object 810 and the hard transparent plate 610 have hardness enough not to easily become deformed, and a material thereof is not particularly limited. The hard transparent plate 610 is the same as the hard transparent plate described in Embodiment 2. In FIG. 16, the test object 810 has a convex portion 820. Here, the sheet of colloidal crystals immobilized in resin 100 having flexibility enough to easily become deformed denotes that the sheet of colloidal crystals immobilized in resin 100 is in a state in which said sheet can become deformed by the pressing step so as to reflect the unevenness distribution (or the hardness distribution) of the test object 810. It should be noted that the pressing step may be performed by mechanically pressing, for example, tightening a screw using a jig, or by manually pressing the hard transparent plate 610 against the sheet of colloidal crystals immobilized in resin 100.

In the step S710, the test object 810 is preferably covered with the sheet of colloidal crystals immobilized in resin 100 through an opaque flexible sheet (not illustrated) interposed therebetween. The opaque flexible sheet makes it possible to reduce reflection of light from the test object 810 other than Bragg reflected light, and accordingly, clearer color development of a structural color can be observed. Such opaque flexible sheet is a material capable of fitting the unevenness distribution of the test object 810, and examples of the sheet include a rubber sheet colored in black or the like, colored cloth, and various resin films. Alternatively, also in the case where, prior to the step S710, a surface of the sheet of colloidal crystals immobilized in resin 100, the surface being in contact with the test object 810, is painted over with a colored paint, or in the case where a colored rubber paste or the like is applied to said surface, the same effect as in the case of using the opaque flexible sheet can be produced. By the step S710, an area of the sheet of colloidal crystals immobilized in resin 100, the area coming into contact with the convex portion 820, is pressed and deformed. As a result, the particle spacing between colloidal particles in the pressed and deformed area is different from the particle spacing between colloidal particles in other areas.

Step S720: Illumination light 510 is irradiated on the sheet of colloidal crystals immobilized in resin 100, and the sheet of colloidal crystals immobilized in resin 100 is observed through the hard transparent plate 610. The illumination light 510 is the illumination light described in Embodiment 2, and the illumination light is irradiated on the sheet of colloidal crystals immobilized in resin 100 in the same manner as in the step, described in Embodiment 2, of irradiating illumination light. The observation may be visual observation, or may be made by photographing using a digital camera or the like or by measuring a reflection spectrum with a spectrometer. By the step S720, Bragg reflected light 830 is observed. Specifically, the Bragg reflected light 830 is constituted of Bragg reflected light based on the non-deformed area and Bragg reflected light based on the deformed area.

Step S730: Based on an observation result obtained in the step S720, the detection of unevenness distribution is performed. Specifically, in the case where an observation result obtained in the step S720 is the color distribution of a structural color that is photographed by a digital camera, the observation result 840 is compared with the color distribution 850 (pre-measurement color distribution) of a structural color of the sheet of colloidal crystals immobilized in resin before the step S710, and if these color distributions are the same, the absence of unevenness distribution in the test object 810 is detected, whereas if these color distributions are different, the presence of unevenness distribution in the test object 810 is detected. In FIG. 16, compared with the pre-measurement color distribution 850, the observation result 840 shows a change of the structural color in an area corresponding to the convex portion 820.

Alternatively, in the step S730, in the case where an observation result is a reflection spectrum measured throughout the entire area of the sheet of colloidal crystals immobilized in resin 100, said reflection spectrum may be compared with a reflection spectrum measured throughout the entire area of the sheet of colloidal crystals immobilized in resin 100 before the step S710. In this case, if these reflection spectra are the same throughout the entire area of the sheet, the absence of unevenness distribution in the test object 810 is detected, whereas if the reflection spectra are different, the presence of unevenness distribution in the test object 810 is detected, A measurement of a reflection spectrum by using a spectrometer makes it possible to detect an unevenness distribution that is too minute to be visually recognized. Furthermore, the use of such detection result makes mapping of unevenness distribution possible.

With reference to FIGS. 15 and 16, the case where the test object 810 had an unevenness distribution was described in detail, and the same goes for a case where the surface of the test object has a hardness distribution. That is, a method of detecting the hardness distribution of the surface of a test object according to the present invention includes the steps of: in the same manner as in the step S710, covering the test object with the sheet of colloidal crystals immobilized in resin and pressing the test object with a hard transparent plate; in the same manner as in the step S720, irradiating illumination light on the sheet of colloidal crystals immobilized in resin and observing said sheet of colloidal crystals immobilized in resin through the hard transparent plate; and, in the same manner as in the step S730, detecting a hardness distribution based on an observation result. Each of the steps is also performed in the same manner as the method of detecting an unevenness distribution, and therefore, detailed descriptions about the steps will be omitted. In the case where the surface of a test object has hardness distribution, through the pressing step, an area of the sheet of colloidal crystals immobilized in resin, the area coming into contact with a high hardness portion of the test object, is pressed, thereby becoming deformed, whereas an area of the sheet of colloidal crystals immobilized in resin, the area coming into contact with a low hardness portion of the test object, hardly becomes deformed. As a result, the particle spacing between colloidal particles in the pressed and deformed area is different from the particle spacing between colloidal particles in other areas, and accordingly, in the observation step and the detection step, can be detected as a change in the color distribution of a structural color or a change in reflection spectrum.

Embodiment 4

Figure 17:
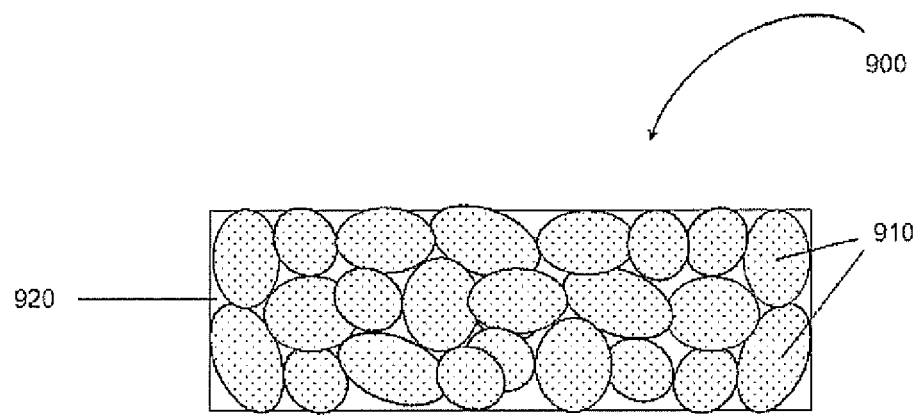
FIG. 17 is a schematic diagram illustrating a structural color sheet according to the present invention.

In Embodiment 4, a structural color sheet produced by using the sheet, described in Embodiment 1, of colloidal crystals immobilized in resin is described. FIG. 17 is a schematic diagram illustrating a structural color sheet according to the present invention. The structural color sheet 900 according to the present invention includes a plurality of sheet pieces of colloidal crystals immobilized in resin 910, and these sheet pieces are immobilized in a resin 920. The plurality of sheet pieces of colloidal crystals immobilized in resin 910 is cut out of the sheet of colloidal crystals immobilized in resin 100 described in Embodiment 1. It should be noted that there is no particular limitation on the shape of cut-out pieces. The plurality of sheet pieces of colloidal crystals immobilized in resin 910 is positioned in the resin 920 in an arbitrary orientation relationship.

The resin 920 denotes a solid material formed of a polymer, such as synthetic resin, plastics, or elastomer, and the same resin as the resin 120 described in Embodiment 1 may be employed. The resin in the plurality of sheet pieces of colloidal crystals immobilized in resin 910 and the resin 920 do not necessarily have to be the same, but, are preferably the same in order to surely exhibit the characteristics of the structural color sheet 900. In the structural color sheet 900 according to the present invention, each of the plurality of sheet pieces of colloidal crystals immobilized in resin 910 includes a plurality of crystal domains in which colloidal particles are immobilized in a resin as described in detail in Embodiment 1, and satisfies Condition (1) and Condition (2). That is, when each of the plurality of sheet pieces of colloidal crystals immobilized in resin 910 is irradiated with illumination light from the direction of a predetermined azimuth angle, the observation axis of an observer squarely facing the sheet surface and the illumination axis of the illumination light do not overlap, and therefore, the observer squarely facing the sheet surface can easily observe a structural color of the sheet pieces of colloidal crystals immobilized in resin 910.

However, in the structural color sheet 900 according to the present invention, such plurality of sheet pieces of colloidal crystals immobilized in resin 910 is positioned in an arbitrary orientation relationship, and therefore, the direction of illumination light is not limited to the direction of a predetermined azimuth angle (for example, a direction perpendicular to the shearing direction), and even in the case of irradiation of illumination light from a direction of an azimuth angle other than the predetermined azimuth angle, there can be brought about a state in which the observation axis of an observer facing the sheet surface and the illumination axis of the illumination light do not overlap, and the surface reflected light of illumination light and Bragg reflected light do not overlap, and accordingly, the observer facing the sheet surface of the structural color sheet 900 can observe a structural color more easily than observe a structural color of a single sheet of colloidal crystals immobilized in resin as a whole.

Although there is no particular limitation on a method of producing the structural color sheet 900 according to the present invention, it is beneficial that, for example, a liquid dispersion is disposed in the form of sheet, and undergoes ultraviolet irradiation, heating, or the like to be polymerized and solidified, the liquid dispersion being obtained by dispersing the plurality of sheet pieces of colloidal crystals immobilized in resin 910 cut out of the sheet of colloidal crystals immobilized in resin 100 in a dispersion medium comprising a monomer, an oligomer, a macromer, or a combination of these of a compound to be polymerized by ultraviolet irradiation, heating, or the like, and thereby to form the resin 920.

It should be noted that the method, described in Embodiment 2, for displaying a structural color may be applied using the structural color sheet 900, or the method, described in Embodiment 3, for detecting the unevenness distribution or the hardness distribution of a test object may be applied using the structural color sheet 900. Also in these cases, in the step of irradiating illumination light, the direction of shinning illumination light is not limited to the direction of a predetermined azimuth angle (for example, a direction perpendicular to the shearing direction), and illumination light may be irradiated from a direction other than the direction of the predetermined azimuth angle, and therefore, there is less limitation on the embodiment of the methods, which is advantageous.

Next, the present invention will be described in detail using specific examples, but, it should be noted that the present invention is not limited to these examples.

EXAMPLES

Example 1

In Example 1, a sheet of colloidal crystals immobilized in resin was produced, the sheet having a particle diameter of 150 nm, a particle concentration 17% by volume, and a sheet thickness of 1 mm, and being flexible and easily deformable at room temperature. A liquid colloidal dispersion was prepared by dispersing silica particles having a particle diameter of 150 nm as colloidal particles in a dispersion medium obtained by adding an ultraviolet-activated polymerization initiator to a liquid monomer of a compound, 4-hydroxybutylacrylate (4-HBA). The particle concentration of the liquid colloidal dispersion was 17% by volume. It was confirmed that the liquid colloidal dispersion visually exhibited a play-of-color effect and was in a colloidal crystal state. This liquid colloidal dispersion was sandwiched between two glass plates that horizontally face each other as illustrated in FIG. 12, and the upper one of the glass plates was fixed, while the lower one of the glass plates was imparted vibrational-translational motion linearly in the horizontal direction, whereby the sandwiched liquid colloidal dispersion undergoes the shearing treatment. The distance between the surfaces, facing each other, of the two glass plates was 1 mm. The direction of the vibrational-translational motion coincides with the direction of shearing.

The conditions of the vibrational-translational motion were as follows.

Vibration frequency: 10 Hz
Vibration amplitude: twice the distance between the surfaces
Processing time: 1 minute The shearing treatment brought an orientation state in which the entire surface of the liquid colloidal dispersion assumed a uniform structural color. Subsequently, ultraviolet irradiation was performed to polymerize and solidify the dispersion medium, whereby a 1-mm-thick sheet of colloidal crystals immobilized in resin was produced. By polymerization, 4-HBA was made into an acrylic resin being easily elastic deformable at room temperature (that is, highly flexible), and accordingly, the obtained sheet of colloidal crystals immobilized in resin (hereinafter, simply referred to as a sample of Example 1) was also an easily elastic deformable material.

Figure 18A:
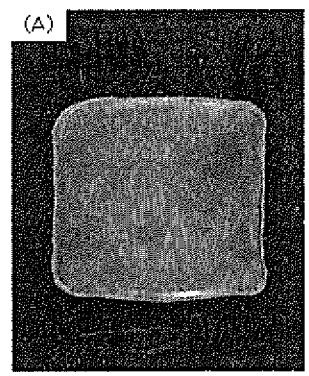
FIG. 18A is a diagram illustrating an observation result of a structural color of a sample of Example 1.
Figure 18B:
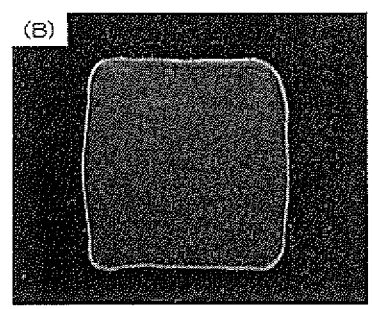
FIG. 18B is a diagram illustrating an observation result of a structural color of the sample of Example 1.

Next, visual observation and photograph evaluation of the sample of Example 1 were carried out. In the sample of Example 1, the direction of an azimuth angle (equivalent to θ=0) serving as a reference was the same as the shearing direction. From a direction having an azimuth angle θ of 90 degree and an incident angle γ of incident light of 45 degree, the sample of Example 1 was irradiated with fluorescent light, and observed from a direction facing the sheet surface of the sample of Example 1 (that is, the direction of the normal line of the sheet surface). FIG. 18A shows the result. Here, θ=90 degree denotes a direction perpendicular to the shearing direction, and hence is substantially equivalent to 270 degree. The reason for this is that the shearing treatment is performed by a reciprocating motion (hereinafter the same). From a direction having an azimuth angle θ of 0 degree and an incident angle γ of 45 degree, the sample of Example 1 was irradiated with fluorescent light, and observed from a direction squarely facing the sheet surface of the sample of Example 1. FIG. 18B shows the result. Here, the shearing treatment is performed by a reciprocating motion, and therefore, θ=0 degree denotes the shearing direction, and hence is substantially equivalent to 180 degree (hereinafter the same).

Next, using an optical system (a coaxial fiber spectrometer) illustrated in FIG. 7, a back reflection spectrum (the dependence of reflection intensity on wavelength) of the sample of Example 1 was measured. The wavelength measurement range was 350 nm to 1050 nm. Measurement apparatuses used here were: multichannel spectrometer S-2600 manufactured by SOMA OPTICS, LTD., as a spectrometer; a fiber connection type halogen lamp manufactured by the same company, as a light source; and a two-way diffused-reflection probe manufactured by the same company, as an optical fiber and a fiber head.

Figure 25B:
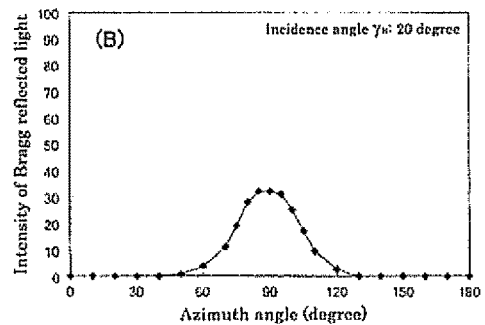
FIG. 25B is a diagram illustrating dependency on the azimuth angle of intensity of Bragg back reflection of the sample of Example 1.
Figure 25C:
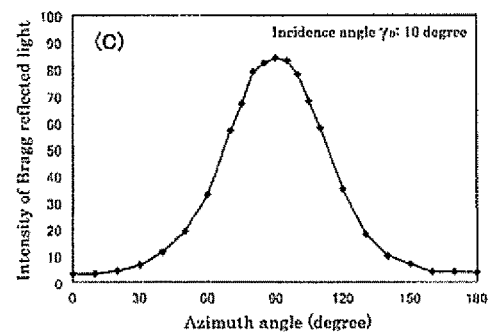
FIG. 25C is a diagram illustrating dependency on the azimuth angle of intensity of Bragg back reflection of the sample of Example 1.

First, for the sample of Example 1, the azimuth angle of a measurement axis was fixed in the same direction as the shearing direction (θ=0 degree or 180 degree), and the dependence of Bragg reflection intensity on incident angle with respect to a sheet surface in a back reflection spectrum measurement was measured. That is, in a state of θ=0, Bragg back reflection was measured using an incident angle $\gamma_B$ of incident light as a variable. Next, for the sample of Example 1, the azimuth angle of a measurement axis was fixed in a direction (θ=90 degree or 270 degree) perpendicular to the shearing direction, and the dependence of Bragg reflection intensity on incident angle with respect to the sheet surface in a back reflection spectrum measurement was measured. That is, in a state of θ=90, Bragg back reflection was measured using an incident angle $\gamma_B$ as a variable. FIGS. 24A and 24B show the respective results. Furthermore, for the sample of Example 1, the incident angle $\gamma_B$ of a measurement axis was fixed in 1 degree increments in a range of from 0 degree to 30 degree, and the azimuth angle dependence of Bragg reflection intensity in aback reflection spectrum measurement was measured. FIGS. 25A to 25C show some results. Here, in the case where a plurality of Bragg reflection peaks is present in a back reflection spectrum, the maximum peak intensity is adopted. On the other hand, in the case where no peak is present, peak intensity is regarded as zero. It should be noted that a peak intensity value is represented by a value relative to a back reflection intensity taken as 100, the back reflection intensity being measured using white copy paper as a reference sample and obtained when the incident angle $\gamma_B$ is 0 degree.

Example 2

In Example 2, a sheet of colloidal crystals immobilized in resin was produced, the sheet having a particle diameter of 150 nm, a particle concentration 11% by volume, and a sheet thickness of 1 mm, and being flexible and easily deformable at room temperature. The production conditions of the sheet of colloidal crystals immobilized in resin in Example 2 are the same as those in Example 1, except that the particle concentration is different from that in Example 1, and therefore, a further description of the conditions will be omitted. As in the case of Example 1, the sample of Example 2 was visually observed and photographically evaluated.

Example 3

In Example 3, a sheet of colloidal crystals immobilized in resin was produced, the sheet having a particle diameter of 180 nm, a particle concentration 17% by volume, and a sheet thickness of 1 mm, and being flexible and easily deformable at room temperature. The production conditions of the sheet of colloidal crystals immobilized in resin in Example 3 are the same as those in Example 1, except that the particle diameter is different from that in Example 1, and therefore, a further description of the conditions will be omitted. As in the case of Example 1, the sample of Example 3 was visually observed and photographically evaluated.

Example 4

Figure 19A:
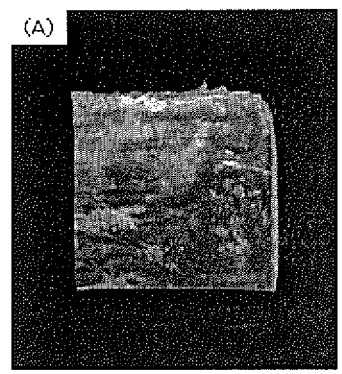
FIG. 19A is a diagram illustrating an observation result of a structural color of a sample of Example 4.
Figure 26A:
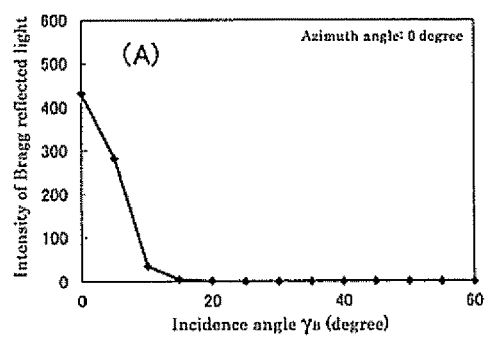
FIG. 26A is a diagram illustrating dependency on the incident angle of intensity of Bragg back reflection of a sample of Example 4.
Figure 26B:
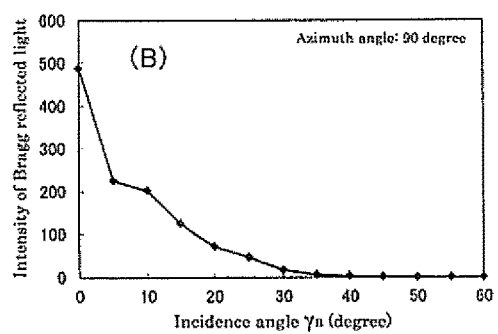
FIG. 26B is a diagram illustrating dependency on the incident angle of intensity of Bragg back reflection of the sample of Example 4.
Figure 27:
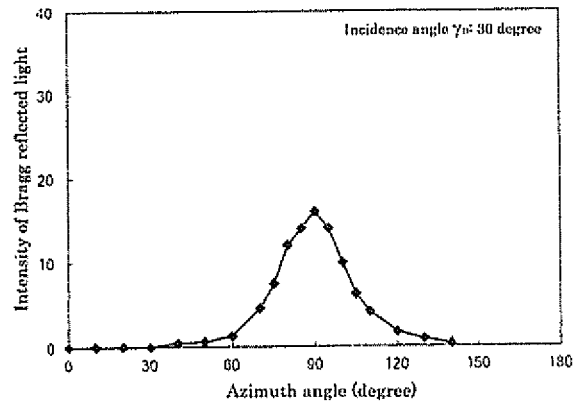
FIG. 27 is a diagram illustrating dependency on the azimuth angle of intensity of Bragg back reflection of a sample of Example 4

In Example 4, a sheet of colloidal crystals immobilized in resin was produced, the sheet having a particle diameter of 180 nm, a particle concentration 32% by volume, and a sheet thickness of 1 mm, and being flexible and easily deformable at room temperature. The production conditions of the sheet of colloidal crystals immobilized in resin in Example 4 are the same as those in Example 1, except that the particle diameter and the particle concentration are different from those in Example 1, and therefore, a further description of the conditions will be omitted. As in the case of Example 1, the sample of Example 4 was visually observed and photographically evaluated. As in the case of Example 1, a back reflection spectrum of the sample of Example 4 was measured. These results are shown in FIG. 19A (θ=90 degree, γ=45 degree), FIG. 19B (θ=0 degree, γ=45 degree), FIG. 26A (θ=0 degree), FIG. 26B (θ=90 degree), and FIG. 27 ($\gamma_B$=30 degree).

Example 5

Figure 20A:
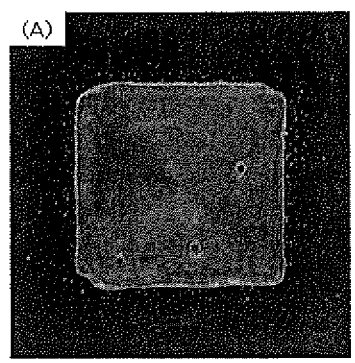
FIG. 20A is a diagram illustrating an observation result of a structural color of a sample of Example 5.
Figure 28A:
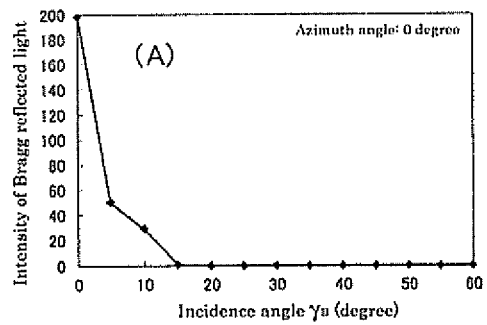
FIG. 28A is a diagram illustrating dependency on the incident angle of intensity of Bragg back reflection of a sample of Example 5.
Figure 28B:
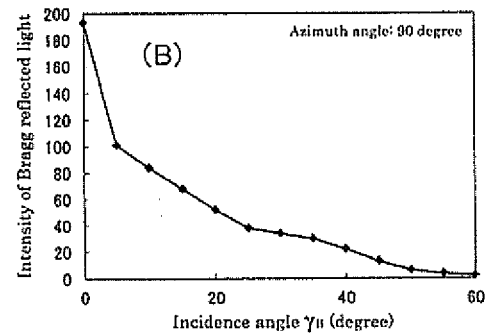
FIG. 28B is a diagram illustrating dependency on the incident angle of intensity of Bragg back reflection of the sample of Example 5.
Figure 29:
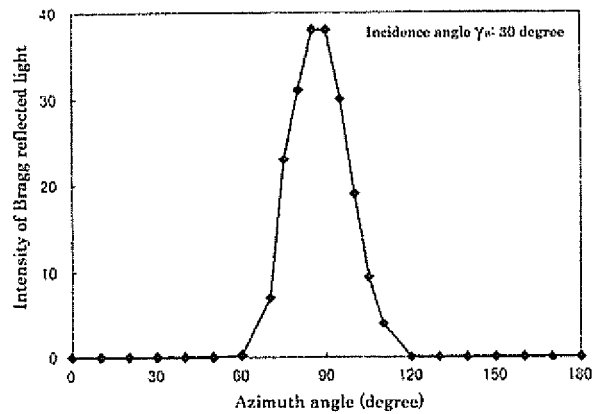
FIG. 29 is a diagram illustrating dependency on the azimuth angle of intensity of Bragg back reflection of the sample of Example 5.

In Example 5, a sheet of colloidal crystals immobilized in resin was produced, the sheet having a particle diameter of 150 nm, a particle concentration 17% by volume, and a sheet thickness of 0.5 mm, and being flexible and easily deformable at room temperature. The production conditions of the sheet of colloidal crystals immobilized in resin in Example 5 are the same as those in Example 1, except that the sheet thickness is different from that in Example 1, and therefore, a further description of the conditions will be omitted. As in the case of Example 1, the sample of Example 5 was visually observed and photographically evaluated. As in the case of Example 1, a back reflection spectrum of the sample of Example 5 was measured. These results are shown in FIG. 20A (θ=90 degree, γ=45 degree), FIG. 20B (θ=0 degree, γ=45 degree), FIG. 28A (θ=0 degree), FIG. 28B (θ=90 degree), and FIG. 29 ($\gamma_B$=30 degree).

Example 6

Figure 21A:
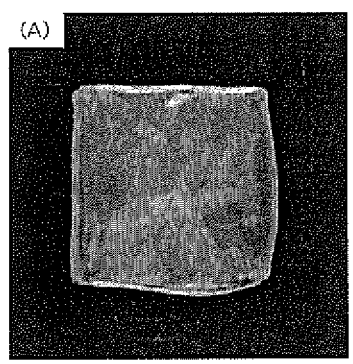
FIG. 21A is a diagram illustrating an observation result of a structural color of a sample of Example 6.
Figure 30A:
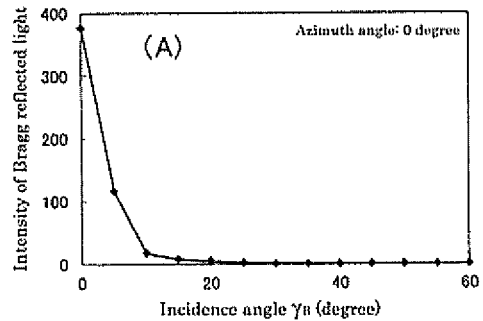
FIG. 30A is a diagram illustrating dependency on the incident angle of intensity of Bragg back reflection of a sample of Example 6.
Figure 30B:
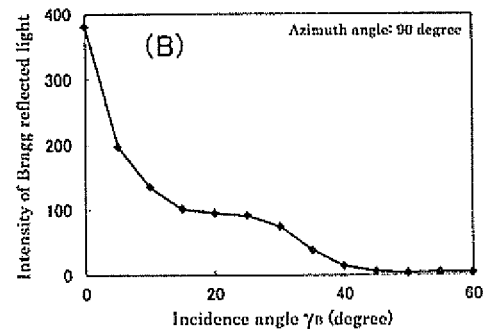
FIG. 30B is a diagram illustrating dependency on the incident angle of intensity of Bragg back reflection of the sample of Example 6.
Figure 31:
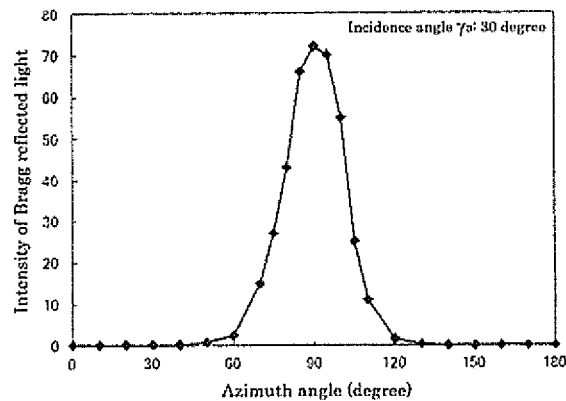
FIG. 31 is a diagram illustrating dependency on the azimuth angle of intensity of Bragg back reflection of the sample of Example 6.

In Example 6, a sheet of colloidal crystals immobilized in resin was produced, the sheet having a particle diameter of 150 nm, a particle concentration 17% by volume, and a sheet thickness of 1 mm, and having a high hardness, thereby being undeformable at room temperature. The production conditions of the sheet of colloidal crystals immobilized in resin in Example 6 are the same as those in Example 1, except that a liquid monomer of a compound, 2-hydroxyethyl methacrylate (2-HEMA), to form an acrylic resin having a high hardness at room temperature was used as a dispersion medium, and therefore, a further description of the conditions will be omitted. As in the case of Example 1, the sample of Example 6 was visually observed and photographically evaluated. As in the case of Example 1, a back reflection spectrum of the sample of Example 6 was measured. These results are shown in FIG. 21A (θ=90 degree, γ=45 degree), FIG. 21B (θ=0 degree, γ=45 degree), FIG. 30A (θ=0 degree), FIG. 30B (θ=90 degree), and FIG. 31 ($\gamma_B$=30 degree).

Example 7

In Example 7, a sheet of colloidal crystals immobilized in resin was produced, the sheet having a particle diameter of 150 nm, a particle concentration 17% by volume, and a sheet thickness of 2 mm, and having a high hardness, thereby being undeformable at room temperature. The production conditions of the sheet of colloidal crystals immobilized in resin in Example 7 are the same as those in Example 6, and therefore, a further description of the conditions will be omitted. As in the case of Example 1, the sample of Example 7 was visually observed.

Comparative Example 8

Figure 22A:
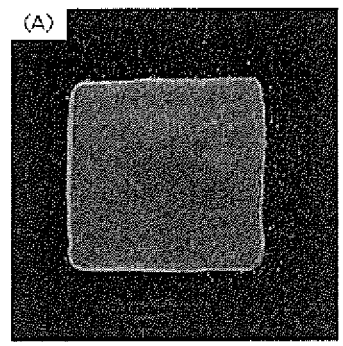
FIG. 22A is a diagram illustrating an observation result of a structural color of a sample of Comparative Example 8.

In Comparative Example 8, a sheet of colloidal crystals immobilized in resin was produced, the sheet having a particle diameter of 150 nm, a particle concentration 17% by volume, and a sheet thickness of 1 mm, and being flexible and easily deformable at room temperature, the colloidal crystals being non-oriented polycrystals (for example, corresponding to colloidal crystals described in Non-patent Reference 1). As in the case of Example 1, a liquid colloidal dispersion was prepared, and sandwiched between two glass plates horizontally facing each other as illustrated in FIG. 12. Without the shearing treatment, the liquid colloidal dispersion underwent ultraviolet irradiation as it was to polymerize and solidify a dispersion medium. Thus, the sheet of colloidal crystals immobilized in resin, the colloidal crystals being non-oriented polycrystals, was obtained. As in the case of Example 1, the sample of Comparative Example 8 was visually observed and photographically evaluated. As in the case of Example 1, a back reflection spectrum of the sample of Comparative Example 8 was measured. It should be noted that, since the shearing treatment was not performed, the direction of translation motion of the glass plates in the case of executing the shearing treatment was taken as the direction of an azimuth angle serving as a reference. These results are shown in FIG. 22A ($\theta$=90 degree, $\gamma$=45 degree), FIG. 22B ($\theta$=0 degree, $\gamma$=45 degree), FIG. 32A ($\theta$=0 degree), FIG. 32B ($\theta$=90 degree), and FIG. 33 ($\gamma_B$=30 degree).

Comparative Example 9

Figure 23A:
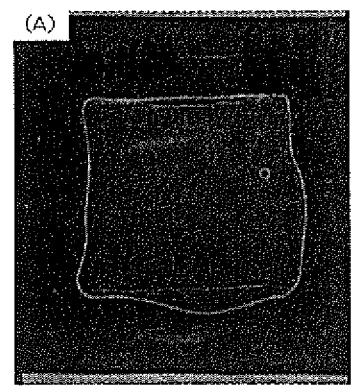
FIG. 23A is a diagram illustrating an observation result of a structural color of a sample of Comparative Example 9.
Figure 34A:
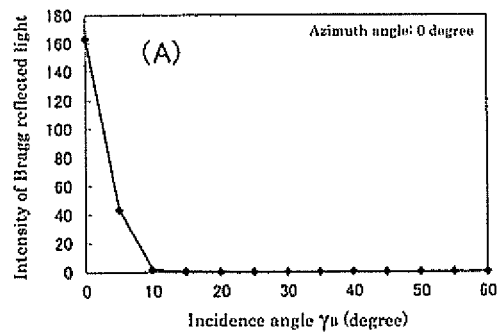
FIG. 34A is a diagram illustrating dependency on the incident angle of intensity of Bragg back reflection of a sample of Comparative Example 9.
Figure 34B:
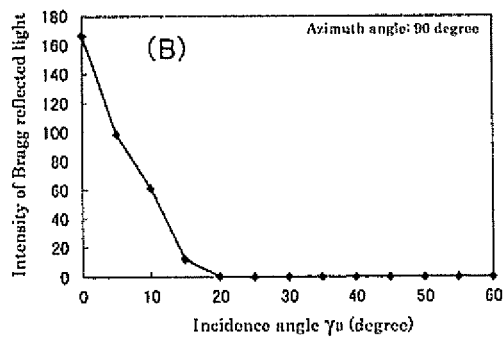
FIG. 34B is a diagram illustrating dependency on the incident angle of intensity of Bragg back reflection of the sample of Comparative Example 9.
Figure 35:
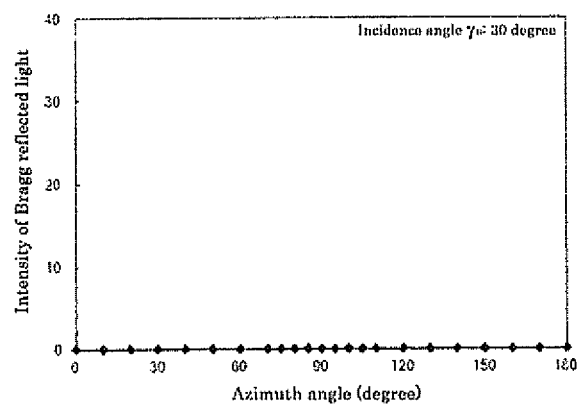
FIG. 35 is a diagram illustrating dependency on the azimuth angle of intensity of Bragg back reflection of the sample of Comparative Example 9.

In Comparative Example 9, a sheet of surface-oriented colloidal crystals (for example, corresponding to colloidal crystals described in Non-patent Reference 2) immobilized in resin was produced, the sheet having a particle diameter of 150 nm, a particle concentration 17% by volume, and a sheet thickness of 0.3 mm, and being flexible and easily deformable at room temperature. The production conditions of the sheet of colloidal crystals immobilized in resin in Comparative Example 9 are the same as those in Example 1, except that the sheet thickness is different from that in Example 1, and therefore, a further description of the conditions will be omitted. As in the case of Example 1, the sample of Comparative Example 9 was visually observed and photographically evaluated. As in the case of Example 1, a back reflection spectrum of the sample of Comparative Example 9 was measured. These results are shown in FIG. 23A ($\theta$=90 degree, $\gamma$=45 degree), FIG. 23B ($\theta$=0 degree, $\gamma$=45 degree), FIG. 34A ($\theta$=0 degree), FIG. 34B ($\theta$=90 degree), and FIG. 35 ($\gamma_B$=30 degree).

Example 10

In Example 10, a sheet of colloidal crystals immobilized in resin was produced, the sheet having a particle diameter of 150 nm, a particle concentration 17% by volume, and a sheet thickness of 1 mm, and having a high hardness, thereby being undeformable at room temperature. The production conditions of the sheet of colloidal crystals immobilized in resin in Example 10 are the same as those in Example 1, except that a compound to form an epoxy resin as a resin having a high hardness at room temperature was used in place of 4-HBA (a compound to form an acrylic resin) in Example 1, and the compound was polymerized by heating. The details are as follows. The compound to form an epoxy resin included bisphenol-A diglycidyl ether as a base and 4-methylhexahydrophthalic anhydride as a curing agent. A liquid obtained by blending the base with the curing agent at a weight ratio of 1:1 was used as a dispersion medium, and silica particles were dispersed in the dispersion medium to prepare a liquid dispersion. This liquid dispersion was made to undergo the shearing treatment under the same conditions as those in Example 1, and subsequently heated to polymerize and solidify the dispersion medium, whereby a 1-mm-thick sheet of colloidal crystals immobilized in resin was obtained. As in the case of Example 1, the sample of Example 10 was visually observed.

For the sake of simplicity, the above-mentioned experimental conditions of Examples and Comparative Examples 1 to 10 are summarized in Table 1.

TABLE 1

List of the experimental conditions of Examples and Comparative Examples 1-10

| Example | | Particle diameter (nm) | Resin Characteristics @ Room Temperature | Kind | Compound | Particle concentration (vol %) | Sheet thickness (mm) |
|---|---|---|---|---|---|---|---|
| Example | 1 | 150 | Deformable | Acrylic resin | 4-HBA | 17 | 1 |
| Example | 2 | 150 | Deformable | Acrylic resin | 4-HBA | 11 | 1 |
| Example | 3 | 180 | Deformable | Acrylic resin | 4-HBA | 17 | 1 |
| Example | 4 | 180 | Deformable | Acrylic resin | 4-HBA | 32 | 1 |
| Example | 5 | 150 | Deformable | Acrylic resin | 4-HBA | 17 | 0.5 |
| Example | 6 | 150 | Undeformable | Acrylic resin | 2-HEMA | 17 | 1 |
| Example | 7 | 150 | Undeformable | Acrylic resin | 2-HEMA | 17 | 2 |
| Comparative Example | 8 | 150 | Deformable | Acrylic resin | 4-HBA | 17 | 1 |
| Comparative Example | 9 | 150 | Deformable | Acrylic resin | 4-HBA | 17 | 0.3 |

TABLE 1-continued

List of the experimental conditions of Examples and Comparative Examples 1-10

| Example | | Particle diameter (nm) | Resin | | | Particle concentration (vol %) | Sheet thickness (nm) |
|---|---|---|---|---|---|---|---|
| | | | Characteristics @ Room Temperature | Kind | Compound | | |
| Example | 10 | 150 | Undeformable | Epoxy resin | Bisphenol-A diglycidyl ether, 4-methylhexahydro-phthalic anhydride | 17 | 1 |

Figure 19B:
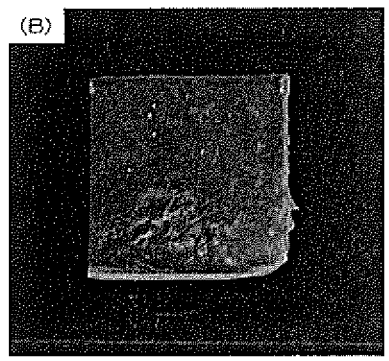
FIG. 19B is a diagram illustrating an observation result of a structural color of the sample of Example 4.
Figure 20B:
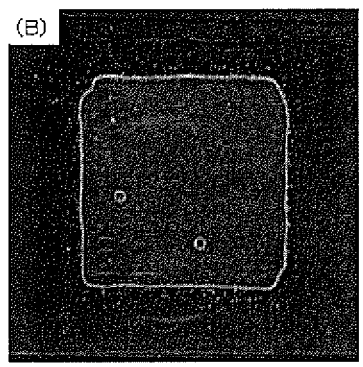
FIG. 20B is a diagram illustrating an observation result of a structural color of the sample of Example 5.
Figure 21B:
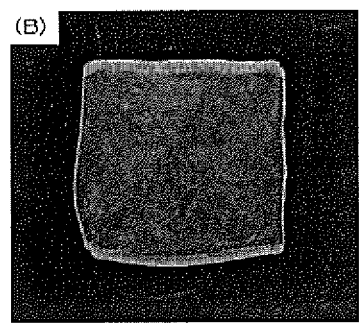
FIG. 21B is a diagram illustrating an observation result of a structural color of the sample of Example 6.
Figure 22B:
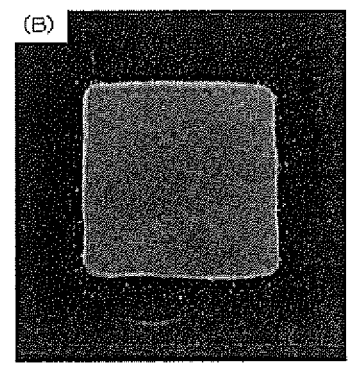
FIG. 22B is a diagram illustrating an observation result of a structural color of the sample of Comparative Example 8.

FIGS. 18A and 18B show observation results of the structural color of the sample of Example 1, FIGS. 19A and 19B show observation results of the structural color of the sample of Example 4, FIGS. 20A and 20B show observation results of the structural color of the sample of Example 5, FIGS. 21A and 21B show observation results of the structural color of the sample of Example 6, FIGS. 22A and 22B show observation results of the structural color of the sample of Comparative Example 8, and FIGS. 23A and 23B show observation results of the structural color of the sample of Comparative Example 9.

Each of FIGS. 18A, 19A, 20A, 21A, 22A, and 23A shows the result obtained by irradiating a corresponding one of the samples with fluorescent light from a direction having an azimuth angle θ of 90 degree and an incident angle of incident light of 45 degree and observing the sample from a direction facing the sheet surface of the sample. Each of FIGS. 18B, 19B, 20B, 21B, 22B, and 23B shows the results obtained by irradiating a corresponding one of the samples with fluorescent light from a direction having an azimuth angle θ of 0 degree and an incident angle of incident light of 45 degree and observing the sample from a direction facing the sheet surface of the sample.

In all of FIGS. 18A to 21A, color development of a structural color (blue) by Bragg reflection was clearly observed. In all of FIGS. 18B to 21B, color development of a structural color by Bragg reflection was not substantially observed. Although not illustrated, it was confirmed that, also in the sample of Example 7, the same color development of a structural color as that in Example 6 was obtained. It should be noted that, compared with the sample of Example 4, the samples of Examples 1 to 3, 5, and 6 were more excellent in sheet uniformity. Hence, it is suggested that a particle concentration of not exceeding 35% by volume is preferable, and furthermore, a particle concentration of not exceeding 20% by volume is more preferable.

Likewise, the samples of Examples 2 and 3 were also irradiated with fluorescent light from a direction having an azimuth angle θ of 90 degree and an incident angle of 45 degree, and observed from a direction facing the sheet surface of the sample, and as a result, although not illustrated, color development of a structural color (red) by Bragg reflection was clearly observed. Likewise, the sample of Example 10 was also irradiated with fluorescent light from a direction having an azimuth angle θ of 90 degree and an incident angle of 45 degree, and observed from a direction facing the sheet surface of the sample, and as a result, color development of a structural color (blue) by Bragg reflection was clearly observed.

Examples 1 to 7, and 10 showed that changes in the particle diameter and the particle concentration of colloidal particles make it possible to achieve color development of different structural colors. It should be noted that a person skilled in the art is capable of suitably selecting the particle diameter and the particle concentration, thereby controlling the wavelength of Bragg reflection and setting a desired structural color.

In all of FIGS. 22A and 22B, color development of an extremely-weak structural color (blue) by Bragg reflection was clearly observed. On the other hand, in all of FIGS. 23A and 23B, color development of a structural color by Bragg reflection was not observed.

Hence, it was found that, even when the samples of Examples 1 to 7, and 10 are irradiated obliquely with respect to a direction perpendicular to the shearing direction, as the direction of a predetermined azimuth angle θ1, an observer facing the sheet surfaces of the samples can observe a structural color. Furthermore, when the observation results of the structural colors of the samples of Examples 1 to 7 were compared with that of the sample of Comparative Example 8, it was shown that the structural color of the samples of Examples 1 to 7 can be more clearly observed than that of the sample of Comparative Example 8. Furthermore, when the observation results of the structural color of the samples of Examples 1 to 7 were compared with those of the samples of Comparative Examples 8 and 9, it was shown that, unlike the crystal domains of the sample of Comparative Example 8, the plurality of crystal domains constituting the samples of Examples 1 to 7 did not gather in a disordered orientation relationship, and, unlike the crystal domains of the sample of Comparative Example 9, the crystal domains of the samples of Examples 1 to 7 did not gather orderly in a specific orientation, and it is suggested that, although the details of the aspect of such gathering have not been solved yet at the moment, the gathering is a fairly novel arrangement.

Furthermore, the observation results of Examples 1 to 7, and 10 showed that irradiating illumination light on a sheet of colloidal crystals immobilized in resin according to the present invention makes it possible to display a structural color. Specifically, irradiating illumination light from a direction different from a direction facing the sheet surface of the sheet of colloidal crystals immobilized in resin according to the present invention, more preferably from a direction perpendicular to the shearing direction makes it possible to display a structural color clearly.

Each of FIGS. 24A, 26A, 28A, 30A, 32A, and 34A shows the incident angle dependence of Bragg back reflection intensity of a corresponding one of the samples in the case where an azimuth angle θ is fixed at 0 degree. Each of FIGS. 24B, 26B, 28B, 30B, 32B, and 34B shows the incident angle dependence of Bragg back reflection intensity of a corresponding one of the samples in the case where an azimuth angle θ is fixed at 90 degree.

From FIGS. 24A and 24B, it was found that, in the sample of Example 1, Bragg back reflection does not occur in the shearing direction (θ=0 degree or 180 degree) when an incident angle $\gamma_3$ was not in the neighborhood of 0 degree, whereas Bragg back reflection occurs in a direction (θ=90 degree or 270 degree) perpendicular to the shearing direction throughout the entire range of incident angle $\gamma_B$ of more than 0 degree and not exceeding 60 degree. Hence, it was confirmed that, as described with reference to FIGS. 8 and 9, in the sample of Example 1, there was present a target area comprising inclined back-reflecting crystal-domains having a crystal lattice plane capable of substantial Bragg back reflection of at least a part of components of incident light in the visible wavelength range, the incident light having an incident angle of more than 0 degree with respect to the specified axis (that is, Condition (1) was satisfied).

More specifically, it was found that, when the sample of Example 1 was made to undergo a back reflection spectrum measurement in a direction perpendicular to the shearing direction, as a direction of a predetermined azimuth angle θ1, throughout the entire range of incident angle $\gamma_B$ of incident light of more than 0 degree and not exceeding 30 degree, the intensity of the Bragg back reflection was not 0 (zero). Hence, it was confirmed that the sample of Example 1 included inclined back-reflecting crystal-domains having a crystal lattice plane having a normal line wherein an angle β formed by the normal line of the crystal lattice plane and the specified axis was more than 0 degree and not exceeding 20 degree.

Among incident angles $\gamma_B$ of incident light in the range of from 0 degree to 30 degree, FIGS. 25C, 25B, and 25A show the results at typical incident angles of 10 degree, 20 degree, and 30 degree, respectively. From FIGS. 25A to 25C, it was found that, at any of the incident angles $\gamma_B$, the intensity of Bragg back reflection in the sample of Example 1 reached a maximum at an azimuth angle θ of 90 degree. Although not illustrated, the same results were obtained at all incident angles $\gamma_B$ other than the incident angles of 10 degree, 20 degree, and 30 degree, the incident angles $\gamma_B$ being measured in the range of from 0 degree to 30 degree. That is, from the results of FIGS. 24A and 24B, and 25A to 25C, it was confirmed that, in the sample of Example 1, the inclined back-reflecting crystal-domains were azimuthally oriented so that the intensity of reflected light by Bragg back reflection varied independent on the azimuth angle of incident light (that is, it was confirmed that Condition (2) was satisfied).

More specifically, to examine the azimuth angle dependence in the sheet surface, Bragg back reflection was measured throughout the entire range of incident angle $\gamma_B$ of incident light of at least more than 0 degree and not exceeding 30 degree, and as a result, at least one peak was obtained on a graph where the intensity of Bragg back reflection was represented by an evaluation axis, and an azimuth angle was represented by a variable axis. It was confirmed that the azimuth angle of any of the peaks was in a range of from 80 degree to 100 degree when the shearing direction was used as a reference of the azimuth angle, and more specifically, it was confirmed that any of inclined back-reflecting crystal-domains was oriented in the direction of an azimuth angle θ1, said direction being perpendicular to the shearing direction.

From FIGS. 26A to 31, it was found that, as in the case of Example 1, all of the samples of Examples 4 to 6 satisfied the above-mentioned Conditions (1) and (2). Although not illustrated, as in the case of Example 1 and Examples 4 to 6, the samples of Examples 2 and 3 also exhibited incident angle dependence and azimuth angle dependence. Furthermore, also in Example 7 and Example 10, when illumination light was irradiated from a direction different from a direction squarely facing the sheet surface and perpendicular to the shearing direction, a blue structural color was developed, and hence, it was suggested that, as in the case of Example 1 and Examples 4 to 6, the samples of Examples 7 and 10 exhibited incident angle dependence and azimuth angle dependence.

Figure 32A:
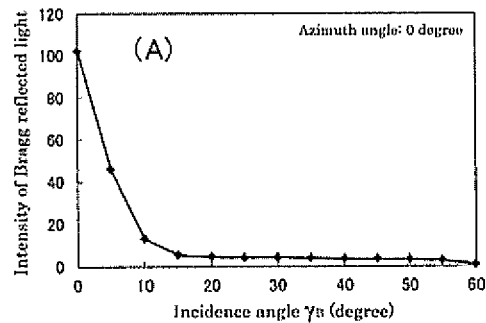
FIG. 32A is a diagram illustrating dependency on the incident angle of intensity of Bragg back reflection of a sample of Comparative Example 8.
Figure 32B:
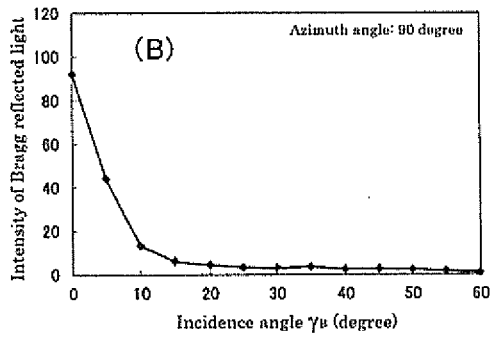
FIG. 32B is a diagram illustrating dependency on the incident angle of intensity of Bragg back reflection of the sample of Comparative Example 8.
Figure 33:
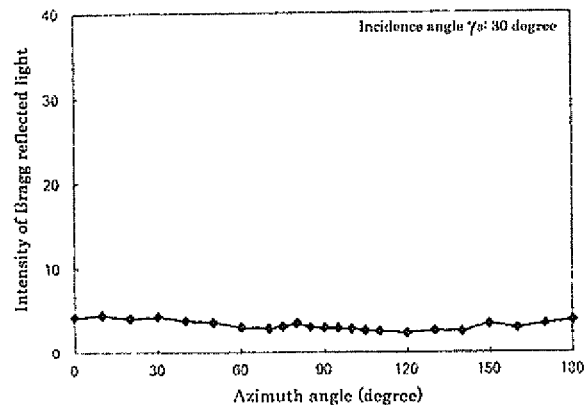
FIG. 33 is a diagram illustrating dependency on the azimuth angle of intensity of Bragg back reflection of the sample of Comparative Example 8.

According to FIGS. 32A and 32B, the sample of Comparative Example 8 satisfied the above-mentioned Condition (1). However, from FIG. 33, it was found that the intensity of Bragg back reflection in the sample of Comparative Example 8 was not dependent on azimuth angle at all, and thus, the above-mentioned Condition (2) was not satisfied. Furthermore, according to FIGS. 34A and 34B, in the sample of Comparative Example 9, Bragg back reflection did occur in neither the shearing direction nor a direction perpendicular to the shearing direction when an incident angle was not in the neighborhood of 0 degree, and thus, the above-mentioned Condition (1) was not satisfied. Furthermore, from FIG. 35, it was found that, in the sample of Comparative Example 9, Bragg back reflection did not occur at any azimuth angle θ when an incident angle $\gamma_B$ was 30 degree, and thus, the above-mentioned Condition (2) was not satisfied.

Hence, it was shown that the samples of Example 1 to 7, and 10 cause Bragg back reflection under specific conditions, and therefore, when the squarely facing direction perpendicular to the surface of the sample is defined as the specified axis in a target area including at least a part of said surface, the following Conditions (1) and (2) are satisfied. (1) The target area includes a plurality of inclined back-reflecting crystal-domains in which colloidal particles are immobilized in a resin, the crystal domains including a crystal lattice plane capable of substantial Bragg back reflection of at least a part of components of incident light in the visible wavelength range, the incident light forming an incident angle of more than 0 degree with the specified axis. (2) When an azimuth angle is specified around the specified axis, the plurality of inclined back-reflecting crystal-domains is azimuthally oriented so that the intensity of reflected light by Bragg back reflection varies in dependent on the azimuth angle of the incident light.

Furthermore, from the results of Examples 1 to 7, and 10, it was shown that there is no limitation on the kind, flexibility, and hardness of a resin. From the results of Examples 1 to 7, and 10, it was shown that the particle concentration is preferably not less than 2% by volume and not exceeding 35% by volume, more preferably not less than 5% by volume and not exceeding 25% by volume, and most preferably not less than 10% by volume and not exceeding 20% by volume. From the results of Example 5, Example 7, and Comparative Example 9, it was shown that the sheet thickness is preferably more than 0.3 mm and not exceeding 10 mm, more preferably not less than 0.5 mm and not exceeding 5 mm, and still more preferably not less than 0.7 mm and not exceeding 3 mm.

Example 11

In Example 11, using the sample of Example 3, detection of unevenness distribution of a test object was performed. As the test object, a relief plate having a projection portion (820 in FIG. 16) shaped like a handle of a double clip was used. This test object was covered with the sample of Example 3 via the a black rubber sheet as an opaque flexible sheet that is interposed therebetween, and was pressed with a glass plate (610 in FIG. 16) as a hard transparent plate (the step S710 in FIG. 15). Subsequently, the sample of Example 3 was irradiated with fluorescent light as illumination light, and observed through the glass plate (the step S720 in FIG. 15). Specifically, illumination light was irradiated on the sample of Example 3 from a direction (θ is 90 degree) perpendicular to the shearing direction for the sample of Example 3 at an incident angle γ of 45 degree with respect to the sheet surface of the sample, and a structural color was photographed with a digital camera. Based on images taken by the digital camera as observation results, detection of unevenness distribution of the test object was performed (the step S730 in FIG. 15).

Figure 36A:
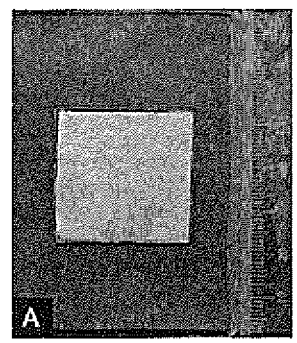
FIG. 36A is a diagram showing a digital-camera image as an observation result of Example 11.
Figure 36B:
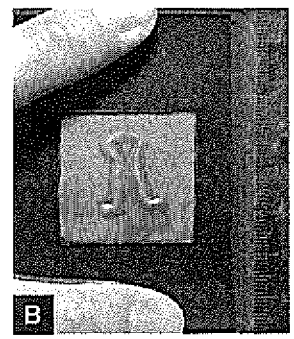
FIG. 36B is a diagram showing a digital-camera image as an observation result of Example 11.

FIGS. 36A and 36B are digital-camera-taken images as the observation results in Example 11. FIG. 36A is a digital-camera-taken image of the sample of Example 3 before the pressing step, and the entirety of the sample assumes a red color. FIG. 36B is a digital-camera-taken image of the sample of Example 3 after the pressing step, and a part of the sample assumes a blue color. These two figures differ in color distribution of structural color, and, in FIG. 36B, there was an area in which a structural color changed from red to blue. It was confirmed that this area corresponded to the projection portion in the shape of a handle of a double clip.

Hence, it was confirmed that the use of the easily deformable sheet of colloidal crystals immobilized in resin according to the present invention allows the unevenness distribution of a test object to be detected. Furthermore, the color distribution of structural color changed according to the unevenness of the test object, and hence, it was found that the method of displaying a structural color according to the present invention, the method being described with reference to FIG. 14, is also effective.

Example 12

In Example 12, using the sample of Example 3, detection of hardness distribution of a test object was performed. The same procedure as that in Example 11 was employed, except that a flexible sponge organization in which cap nuts (two pieces) made of hard metal were embedded was used as the test object.

Figure 37A:
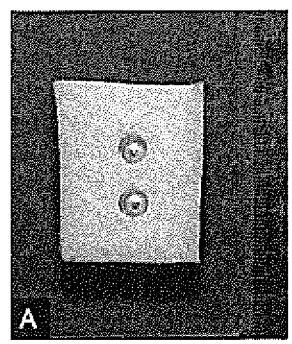
FIG. 37A is a diagram showing a digital-camera image as an observation result of Example 12.
Figure 37B:
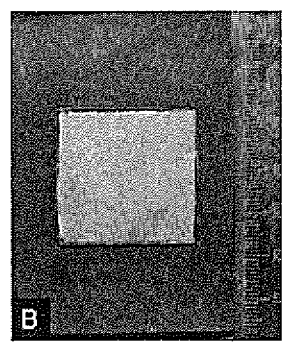
FIG. 37B is a diagram showing a digital-camera image as an observation result of Example 12.
Figure 37C:
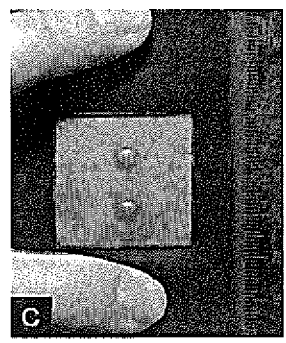
FIG. 37C is a diagram showing a digital-camera image as an observation result of Example 12.

FIGS. 37A to 37C are digital-camera-taken images of the observation results in Example 12. FIG. 37A is a digital-camera-taken image of the test object. FIG. 37B is a digital-camera-taken image of the sample of Example 3 before the pressing step, and the entirety of the sample assumes a red color. FIG. 37C is a digital-camera-taken image of the sample of Example 3 after the pressing step, and a part of the sample assumes a blue color. When FIG. 37B is compared with FIG. 37C, these two figures differ in color distribution of structural color, and, in FIG. 37C, there was an area in which the structural color changed from red to blue. It was confirmed that this area corresponded to an area in which the metal cap nuts illustrated in FIG. 37A are present.

Hence, it was confirmed that the use of the easily deformable sheet of colloidal crystals immobilized in resin according to the present invention makes it possible to detect the hardness distribution of a test object.

INDUSTRIAL APPLICABILITY

The use of the sheet of colloidal crystals immobilized in resin according to the present invention makes it possible for an observer facing the sheet surface to easily observe a structural color by Bragg reflection without overlapping of the observation axis of the observer facing the sheet surface and the illumination axis of illumination light. Furthermore, the use of the sheet of colloidal crystals immobilized in resin according to the present makes it possible for an observer to observe a structural color under a condition where surface reflected light and Bragg reflected light do not overlap, and thus, the effect of clear color development is produced. The sheet of colloidal crystals immobilized in resin according to the present invention functions as a decoration made by making use of the clear color development or a display having various patterns. Furthermore, the use of the sheet of colloidal crystals immobilized in resin according to the present invention makes it possible to detect the unevenness distribution or hardness distribution of a test object by making use of a change in structural color. Furthermore, the intensity of Bragg reflected light emitted in the squarely facing direction changes according to an azimuth angle, and therefore, when a light obliquely illuminating the sheet is moved such that an azimuth angle thereof is changed, the intensity of light emitted in the squarely facing direction changes, and hence, the sheet is expected to be made use of as a moving optical decoration.

In order to distinguish genuine goods from counterfeit goods, a distinguishing tag (what is called a forgery prevention tag) produced using a special material, such as leather, cloth having a special organization, and a luminous material such as a holographic film, is often used for high-grade clothes, bags, and other articles. The sheet of colloidal crystals immobilized in resin according to the present invention has special color development characteristics that conventional materials do not have, the characteristics being such that, for example, a clear structural color can be observed from the squarely facing direction by oblique illumination, and the presence or absence of color development changes according to the azimuth angle of the illumination at that time. Through the utilization of such color development characteristics, the sheet of colloidal crystals immobilized in resin according to the present invention can be also made use of for forgery prevention, for example, by being employed as a material of such forgery prevention tag.

Furthermore, a structural color sheet including the sheet pieces of colloidal crystals immobilized in resin that are cut out of the sheet of colloidal crystals immobilized in resin according to the present invention makes possible the irradiation of illumination light from an arbitrary direction, and therefore, there is no limitation on embodiment, which is advantageous.

EXPLANATION OF NUMERALS

100 sheet of colloidal crystals immobilized in resin target area 110 crystal domain 120,920 resin 130 colloidal particle 200 coaxial fiber spectrometer 210 light source 220 spectrometer 230 optical fiber 240 fiber head 250 irradiation light 260 reflected light 400 liquid colloidal dispersion 410,420 glass plate 500 wall 510 illumination light 520,630 Bragg reflected light 530 surface reflected light 600 relief plate 610 hard transparent plate 620 pattern 640 color distribution 810 test object 820 convex portion 830 reflected light 840 observation result 850 color distribution before measurement 900 structural color sheet 910 sheet piece of sheet of colloidal crystals immobilized in resin

What is claimed is:

1. A sheet of colloidal crystals immobilized in resin wherein a target area includes at least part of a surface of the sheet of colloidal crystals immobilized in resin and a specified axis that is a perpendicular direction to the surface, the sheet of colloidal crystals immobilized in resin satisfying:

(1) the target area includes a plurality of crystal domains including colloidal particles immobilized in resin and crystal lattice planes capable of substantially Bragg-back reflecting at least part of components in a visible wavelength range of incident light having an incident angle of greater than 0 formed with the specified axis; and (2) the plurality of crystal-domains are so oriented that intensity of reflected light caused by the Bragg back reflection varies depending on the azimuth angle of the incident light around the specified axis such that at least one peak is obtained in a plotted graph having an evaluation axis for intensity thereof and a variable axis for an azimuth angle thereof when measurement of the Bragg back reflection is conducted with a changing azimuth angle of the incident light, wherein the plurality of crystal domains are so oriented that a normal line of the crystal lattice planes in each of the plurality of crystal domains causing the Bragg back reflection forms an angle of at least greater than 0 degrees and not exceeding 15 degrees with the specified axis, wherein the sheet of colloidal crystals immobilized in resin is manufactured by a method including a shearing treatment process in which shearing force is applied in a shearing direction that is a reference direction of the azimuth angle and parallel to the surface of the target area, and wherein an azimuth angle of the at least one peak obtained by the measurement of the Bragg back reflection is in a range of from 80 degrees to 100 degrees.

2. The sheet of colloidal crystals immobilized in resin according to claim 1 wherein another crystal domain including crystal lattice planes having a normal line that forms an angle of greater than 15 degrees and not exceeding 20 degrees with the specified axis is included.

3. The sheet of colloidal crystals immobilized in resin according to claim 1 wherein a particle concentration of the colloidal particles is at least 2 vol % and not exceeding 35 vol %.

4. The sheet of colloidal crystals immobilized in resin according to claim 1 wherein the resin is selected from the group consisting of acrylic resin, epoxy resin, siloxane resin (silicone), urethane resin, polyester resin, alkyd resin, fluorine resin, and polyether resin.

5. The sheet of colloidal crystals immobilized in resin according to claim 4 wherein the resin is acrylic resin and wherein a compound to form the acrylic resin is at least one selected from the group consisting of methyl (meth)acrylate, 2-hydroxyethyl (meth)acrylate, 2-hydroxypropyl (meth)acrylate, 4-hydroxybutyl (meth)acrylate, methoxy triethylene glycol (meth)acrylate, methoxy tetraethylene glycol (meth)acrylate, methoxy polyethylene glycol (meth)acrylate, ethylene di(meth)acrylate, triethylene glycol di(meth)acrylate, tetraethylene glycol di(meth)acrylate, polyethylene glycol di(meth)acrylate, polypropylene glycol di(meth)acrylate, trimethylolpropane tri(meth)acrylate, pentaerythritol tri(meth)acrylate, dipentaerythritol hexa(meth)acrylate, and pentaerythritol tetra(meth)acrylate.

6. The sheet of colloidal crystals immobilized in resin according to claim 4 wherein the resin is epoxy resin and wherein a compound to form the epoxy resin comprises a diglycidyl ester derivative compound and/or a diglycidyl ether derivative compound, and a phthalic anhydride derivative compound.

7. The sheet of colloidal crystals immobilized in resin according to claim 6 wherein the diglycidyl ester derivative compound is phthalic acid diglycidyl ester and/or hexahydrophthalic acid diglycidyl ester.

8. The sheet of colloidal crystals immobilized in resin according to claim 6 wherein the diglycidyl ether derivative compound is at least one selected from the group consisting of glycerol polyglycidyl ether; 1,4-butanediol diglycidyl ether; and bisphenol-A diglycidyl ether.

9. The sheet of colloidal crystals immobilized in resin according to claim 6 wherein the phthalic anhydride derivative compound is 4-methylhexahydrophthalic anhydride and/or hexahydrophthalic anhydride.

10. The sheet of colloidal crystals immobilized in resin according to claim 1 wherein a thickness of the sheet of colloidal crystals immobilized in resin is more than 0.3 mm and not exceeding 10 mm.

11. A method of displaying a structural color based on colloidal crystals wherein the method comprising the step of irradiating a sheet of colloidal crystals immobilized in resin according to claim 1 with illumination light.

12. The method according to claim 11 wherein the step of irradiating the sheet with the illumination light is characterized by irradiating the sheet with the illumination light from a direction different from a squarely facing direction against a sheet surface of the sheet of colloidal crystals immobilized in resin.

13. The method according to claim 11 wherein the sheet of colloidal crystals immobilized in resin is manufactured by applying a shearing treatment; and wherein the step of irradiating the sheet with the illumination light is characterized by irradiating the sheet with the illumination light from a direction having an azimuth angle perpendicular to a shearing direction of the shearing treatment.

14. The method according to claim 11 wherein the sheet of colloidal crystals immobilized in resin has a pattern comprising a character or a figure.

15. The method according to claim 11 wherein the sheet of colloidal crystals immobilized in resin is sandwiched at least between a hard transparent plate and a relief plate in which a pattern comprising a character or a figure is formed with a convex and/or a concave; and wherein the method comprises the step of pressing the sheet of colloidal crystals immobilized in resin with the hard transparent plate prior to the step of irradiating the sheet with the illumination light.

16. A method of detecting an unevenness distribution or a hardness distribution of a test object comprises the steps of:

covering the test object with a sheet of colloidal crystals immobilized in resin according to claim 1 and pressing the sheet with a hard transparent plate;

irradiating the sheet of colloidal crystals immobilized in resin with illumination light and observing the sheet of colloidal crystals immobilized in resin through the hard transparent plate; and detecting an unevenness distribution or a hardness distribution based on an observation result obtained in the step of observation.

17. The method according to claim 16 wherein the step of observation comprises irradiating the sheet with the illumination light from a direction different from a squarely facing direction against a sheet surface of the sheet of colloidal crystals immobilized in resin and observing the sheet.

18. The method according to claim 16 wherein the step of detection comprises:

detecting that the test object does not have the unevenness distribution or the hardness distribution when the observation result is same as that of the sheet of colloidal crystals immobilized in resin prior to the step of pressing; and detecting that the test object has the unevenness distribution or the hardness distribution when the observation result is different from that of the sheet of colloidal crystals immobilized in resin prior to the step of pressing.

19. A structural color sheet in which a plurality of sheet pieces of colloidal crystals immobilized in resin are immobilized in resin;

wherein the plurality of sheet pieces of colloidal crystals immobilized in resin are cut out of a sheet of colloidal crystals immobilized in resin according to claim 1, and wherein the plurality of sheet pieces of colloidal crystals immobilized in resin are arranged in an arbitrary orientation relationship in the resin.

* * * * *